(12) United States Patent
Mohebbi

(10) Patent No.: US 9,603,192 B2
(45) Date of Patent: Mar. 21, 2017

(54) METHODS AND APPARATUS FOR HYBRID ACCESS TO A CORE NETWORK

(71) Applicant: Behzad Mohebbi, San Diego, CA (US)

(72) Inventor: Behzad Mohebbi, San Diego, CA (US)

(73) Assignee: nCore Communications, Inc., San Diego, CA (US)

( * ) Notice: Subject to any disclaimer, the term of this patent is extended or adjusted under 35 U.S.C. 154(b) by 230 days.

(21) Appl. No.: 14/156,339

(22) Filed: Jan. 15, 2014

(65) Prior Publication Data

US 2014/0213219 A1 Jul. 31, 2014

Related U.S. Application Data

(60) Provisional application No. 61/849,087, filed on Jan. 18, 2013, provisional application No. 61/848,950, filed on Jan. 16, 2013.

(51) Int. Cl.

| H04J 3/16 | (2006.01) |
|---|---|
| H04W 92/02 | (2009.01) |
| H04W 12/08 | (2009.01) |
| H04W 76/02 | (2009.01) |
| H04L 29/08 | (2006.01) |
| H04W 12/06 | (2009.01) |
| H04W 88/10 | (2009.01) |
| H04W 84/12 | (2009.01) |

(52) U.S. Cl.
CPC ............ *H04W 92/02* (2013.01); *H04L 69/30* (2013.01); *H04W 12/06* (2013.01); *H04W 12/08* (2013.01); *H04W 76/022* (2013.01); *H04W 88/10* (2013.01); *H04W 84/12* (2013.01)

(58) Field of Classification Search
CPC .................. H04L 29/06; H04L 29/08009
USPC ............... 455/411, 448, 445; 370/310.2, 328
See application file for complete search history.

(56) References Cited

U.S. PATENT DOCUMENTS

| 7,899,755 B2 | 3/2011 | Whitfield |
|---|---|---|
| 8,305,965 B2 | 11/2012 | Shen et al. |
| 8,351,960 B2 | 1/2013 | Lister |
| 8,700,710 B1 | 4/2014 | Gallagher et al. |

(Continued)

FOREIGN PATENT DOCUMENTS

| CN | 202634717 U | 12/2012 |
|---|---|---|
| EP | 1988687 A1 | 11/2008 |
| GB | 2353918 B | 12/2003 |
| WO | WO-2011100492 A1 | 8/2011 |
| WO | WO-2012098442 A1 | 7/2012 |
| WO | WO-2012149400 A2 | 11/2012 |
| WO | WO-2012159344 A1 | 11/2012 |
| WO | WO-2013052805 A1 | 4/2013 |

OTHER PUBLICATIONS

3GPP TR 36.806 V9.0.0 entitled "*3rd Generation Partnership Project; Technical Specification Group Radio Access Network; Evolved Universal Terrestrial Radio Access (E-UTRA); Relay architectures for E-UTRA (LTE-Advanced) (Release 9)*", published Mar. 2010.

*Primary Examiner* — Chuck Huynh
(74) *Attorney, Agent, or Firm* — Gazdzinski & Associates, PC

(57) ABSTRACT

Apparatus and methods for hybrid access to a core network. In one embodiment, a wireless router enables a subscriber device to connect to a core network via an intermediate network (e.g., a Wi-Fi network) rather than the network traditionally associated with the core network (e.g., a cellular network). In one implementation, a Wi-Fi Access Point (AP) is configured to directly connect to a Long Term Evolution (LTE) core network as a logical evolved NodeB (eNB).

20 Claims, 16 Drawing Sheets

(56) References Cited

U.S. PATENT DOCUMENTS

| | | |
|---|---|---|
| 8,724,812 B2 | 5/2014 | Senese et al. |
| 8,774,759 B2 | 7/2014 | He |
| 8,793,493 B2 | 7/2014 | Pizano |
| 8,842,524 B2 | 9/2014 | Dake |
| 2004/0068571 A1 | 4/2004 | Ahmavaara |
| 2004/0185777 A1 | 9/2004 | Bryson |
| 2005/0021875 A1 | 1/2005 | Bouthemy et al. |
| 2008/0076425 A1 | 3/2008 | Khetawat et al. |
| 2009/0168799 A1* | 7/2009 | Crowley ............... H04L 12/66 370/463 |
| 2010/0020753 A1 | 1/2010 | Fulknier et al. |
| 2010/0272007 A1* | 10/2010 | Shen ................ H04B 7/2606 370/315 |
| 2010/0296498 A1 | 11/2010 | Karaoguz |
| 2011/0044218 A1 | 2/2011 | Kaur et al. |
| 2012/0044908 A1 | 2/2012 | Spinelli et al. |
| 2012/0135712 A1 | 5/2012 | Bari |
| 2012/0308004 A1 | 12/2012 | Pudney et al. |
| 2012/0327913 A1* | 12/2012 | Wang ............... H04W 72/1215 370/336 |
| 2013/0047218 A1 | 2/2013 | Smith |
| 2013/0095789 A1 | 4/2013 | Keevill et al. |
| 2014/0171029 A1 | 6/2014 | Holtmanns |
| 2014/0199963 A1 | 7/2014 | Mohebbi |
| 2014/0245007 A1 | 8/2014 | Buer et al. |

\* cited by examiner

METHODS AND APPARATUS FOR HYBRID ACCESS TO A CORE NETWORK

PRIORITY AND RELATED APPLICATIONS

This application claims priority to U.S. Provisional Patent Application Ser. No. 61/849,087 filed on Jan. 18, 2013 and entitled "Network Agnostic Wireless Router (NAWR)", and 61/848,950 filed on Jan. 16, 2013 and entitled "WiFi Over LTE Network (WoLTEN)", each of the foregoing being incorporated herein by reference in its entirety. This application is related to commonly owned and co-pending U.S. patent application Ser. No. 14/156,174, entitled "METHODS AND APPARATUS FOR A NETWORK-AGNOSTIC WIRELESS ROUTER", filed simultaneously herewith on Jan. 15, 2014, incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless communication and data networks. More particularly, in one exemplary aspect, the disclosure is directed to methods and apparatus for hybrid access to a core network.

2. Description of Related Technology

The rapid growth of mobile data services accelerated by, inter alia, the advent of so-called "smartphone" technologies has resulted in a steep increase in the volume of high-speed data transmission and the popularity of mobile services. Coupled with increased popularity is the increased customer expectation for better and more reliable services and network capabilities. Short term solutions for alleviating high capacity demands include unpopular practices such as "data rate throttling", introducing limited and expensive tariffs, and phasing out "unlimited data plans". Longer term solutions require new access technologies (such as Long Term Evolution (LTE)) to meet the customer demands, and further require costly infrastructure investments.

Examples of incipient solutions include e.g., so-called "small cell" (e.g., femtocells, picocells, and microcells), "HetNet" (heterogeneous network) and "Wi-Fi Offloading". As a brief aside, small cell technologies require backhaul connectivity to the network operator's core network; this can complicate deployment as small cells may not have access to sufficient frequency resources, but still require the high capacity underlay (i.e., carrier grade connectivity must be provided at much higher cost per bit). HetNets incorporate multiple different network technologies, and can experience co-channel interference between macro cells and underlay cells. In contrast, there is no shortage of spectrum with "Wi-Fi offloading", Wi-Fi hotspots operate in unlicensed (license exempt) bands where there is an abundance of spectrum (the Industrial Scientific and Medical (ISM) and Unlicensed National Information Infrastructure (U-NII) bands may provide nearly 0.5 GHz of spectrum). For this reason, Wi-Fi offloading is very attractive to network operators; in fact, some small cell base stations have integrated Wi-Fi Access Point (AP) functionalities (e.g., "Wi-Fi ready").

Despite these benefits, there are several fundamental problems associated with Wi-Fi offloading systems and networks. Existing network operators treat the cellular and Wi-Fi networks as two separate business units, which are operated and managed separately. There is also very little integration and interworking between the two networks at operation and services levels. For example, Wi-Fi networks do not have a standard "discovery", "selection" and "access" mechanism and/or procedure. This can result in difficulty getting onto these networks and/or inconsistent Quality of Service (QoS), security and policies. Moreover, cellular networks typically implement a single subscriber identification module (SIM) that is configured to acquire, register, authenticate and cipher communications; in contrast, Wi-Fi networks are based on a variety of "web-based" authentication methods which rely on Wireless Internet Service Provider roaming (WISPr) (or similar variant). WISPr requires that the user enter a user name and a password, which are then authenticated by e.g., a AAA/RADIUS server; this step is both inconvenient and prone to error.

In view of these deficiencies, improved methods and apparatus are needed to enable access to mobile wireless (e.g., cellular) networks utilizing other network technologies. Such improvements would ideally provide an integrated solution for merging e.g., Wi-Fi and cellular networks, making e.g., user experience, policy control, discovery, selection and association, authentication, and QoS, seamless and similar in both networks. Other benefits may include e.g., Wi-Fi roaming, Wi-Fi neutral host, and IP-mobility capabilities, while providing network handoffs for an integrated cellular-Wi-Fi network.

SUMMARY OF THE DISCLOSURE

The present disclosure satisfies the aforementioned needs by providing, inter alia, improved apparatus and methods for hybrid access to a core network.

In one aspect, a method for wireless communications within a first and a second communication systems is disclosed. In one embodiment, the first communication system has at least a first node and a second node in communication with each other, and the method includes: modifying a protocol stack of the first node, the modification including splitting the protocol stack into a first portion of layers and a second portion of layers, the first portion of layers and the second portion of layers configured to transact one or more data payloads; executing the first portion of layers within the first node, and causing the second node to execute the second portion of layers; communicating the one or more data payloads via the second communications system. In one variant, the combined execution of the first portion of layers and the second portion of the layers enables communication with a logical entities in the first communication system.

In another variant, the first node includes a handset, and the second node includes a logical cellular base station system, and the second communication system is a Wireless Local Area Network (WLAN). In one such variant, the handset includes a LTE user equipment (UE), the WLAN AP includes a logical LTE enhanced NodeB (eNB), the cellular network includes an LTE 4G system, and the second communication system includes a WLAN network. In another such variant, the splitting occurs between a radio link control (RLC) layer and medium access control (MAC) layer of a LTE protocol stack.

In yet another variant, the second communication system provides an access tunnel between the first portion of layers and the second portion of layers in an unsecure open mode.

In a further variant, the second communication system provides an access tunnel between the first portion of layers and the second portion of layers in a secure closed mode.

In another exemplary variant, the first node is configured to execute a Wi-Fi over Long Term Evolution (WoLTEN) software application. In one such variant, the second node is configured to execute a Network WoLTEN agent application. In some implementations, a WoLTEN dedicated control channel exists between the WoLTEN software application and the WoLTEN agent. Moreover, the WoLTEN software application may include a multiplexing and de-multiplexing (MUX/DeMUX) buffer and/or the WoLTEN agent application may include a multiplexing and de-multiplexing (MUX/DeMUX) buffer.

In still another variant, the second node is further configured to communicate with one or more handsets.

In still other variants, the second communication system provides an access tunnel between the first node RLC layer and the second node RLC layer of the first communication system.

In another aspect, a wireless router apparatus configured to provide connectivity to a network (e.g., core network) is disclosed. In one embodiment, the wireless router apparatus includes: a network interface, the network interface configured to connect to the core network associated with a first radio technology; a radio interface, the radio interface configured to provide an open wireless network according to a first radio technology different than the second radio technology; a processor; and a non-transitory computer readable medium in data communication with the processor. In one exemplary embodiment, the non-transitory computer readable medium includes one or more instructions which, when executed by the processor, causes the wireless router apparatus to, responsive to receiving one or more transactions for the core network from a subscriber device connected to the open wireless network, translate the received one or more transactions for delivery to the core network.

In one variant, the wireless router apparatus includes a buffer configured to support multiple data pipe instances.

In a another variant, the radio interface is configured to provide access to a Wireless Local Area Network (WLAN), and the network interface is configured to connect to one or more Long Term Evolution (LTE) cellular data networks.

In a further variant, the one or more transactions includes access control information configured to identify the subscriber device to the core network.

In a yet another variant, the translation includes emulation of interactions between a virtualized physical layer and one or more medium access control (MAC) layers.

A subscriber device configured to connect to a core network via a wireless router is also disclosed. In one embodiment, the subscriber device includes: a radio interface, the radio interface configured to connect to a wireless router configured to connect to the core network; a processor; and a non-transitory computer readable apparatus. In one exemplary embodiment, the non-transitory computer readable medium includes one or more instructions which when executed by the processor, causes the subscriber device to: transact one or more data payloads for a logical entity of the core network to the wireless router; and where the one or more data payloads omits at least one physical or medium access control layer parameter required by the core network.

In one variant, the one or more data payloads includes a cryptographic challenge and response test configured to establish secure communications with the first network.

Other features and advantages of the present disclosure will immediately be recognized by persons of ordinary skill in the art with reference to the attached drawings and detailed description of exemplary embodiments as given below.

DETAILED DESCRIPTION OF THE DISCLOSURE

Figure 1:
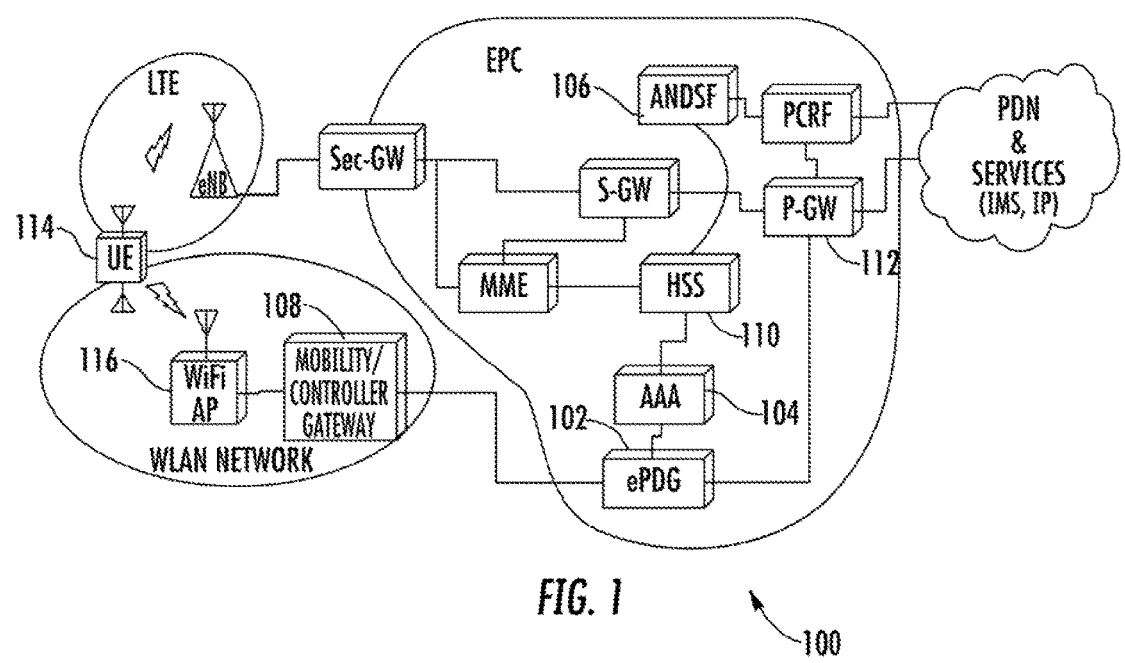
FIG. 1 is a block diagram representation of one prior art 3GPP Release 8 network architecture.

Reference is now made to the drawings, wherein like numerals refer to like parts throughout.

Overview

Methods and apparatus for hybrid access to a network, such as a core network, are disclosed. In one exemplary embodiment, a novel "access tunnel" (e.g., a so-called "Wi-Fi PIPE") enables a subscriber device to contact a core network via an intermediate network (e.g., a Wi-Fi network). In one implementation, the wireless router is configured to directly connect to the core network, using protocols similar (or identical) to existing network entities (e.g., evolved NodeBs (eNBs)). As described in greater detail hereinafter, an exemplary Wi-Fi access point (AP) provides access to a Long Term Evolution (LTE) network. The subscriber device and wireless router are connected via the Wi-Fi PIPE; the wireless router executes a translation process (e.g., a user equipment (UE) medium access control (MAC), virtual physical layer (VPHY), and access point (AP) MAC), thereby seamlessly connecting the subscriber device to the LTE core network.

Various other advantages of the disclosed embodiments are described in greater detail hereinafter.

DETAILED DESCRIPTION OF EXEMPLARY EMBODIMENTS

Exemplary embodiments of the present disclosure are now described in detail. While these embodiments are primarily discussed in the context of a fourth generation Long Term Evolution (4G LTE or LTE-A) wireless network in combination with Wi-Fi hotspot (IEEE 802.11n) operation, it will be recognized by those of ordinary skill that the present disclosure is not so limited. In fact, the various aspects of the disclosure are useful in any wireless network that can benefit from the wireless routing described herein.

As used herein, the term "wireless" means any wireless signal, data, communication, or other interface including without limitation Wi-Fi (IEEE 802.11 and its derivatives such as "b", "a", "g", "n", "ac", etc.), Bluetooth, 3G (e.g., 3GPP, 3GPP2, and UMTS), 4G (LTE, LTE-A, WiMax), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Furthermore, as used herein, the term "network" refers generally to any type of data, telecommunications or other network including, without limitation, data networks (including MANs, PANs, WANs, LANs, WLANs, micronets, piconets, internets, and intranets), satellite networks, cellular networks, and telco networks.

Existing Solutions for Hybrid Access—

In the past, backhaul and indoor coverage were the two biggest "pain points" for a network operator; more recently, mobile network data capacity has become the challenge. Solutions that increase data capacity while saving time and money for the network operators will have high rewards. Even though, network operators have resisted the adoption of Wi-Fi in their networks, it has become apparent that reasonable solutions to the data capacity problem will require Wi-Fi integration.

As a brief aside, spectrum (or bandwidth) is a rare and expensive resource cost for network operators. While most network operators own ~10-20 MHz of bandwidth (at most), Wi-Fi networks operate within unlicensed frequency bands which span several hundred MHz of spectrum. A Wi-Fi system that supports Industrial, Scientific and Medical (ISM 2.4 GHz) and Unlicensed National Information Infrastructure (U-NII 5 GHz) bands will have access to approximately 80 MHz of spectrum at ISM and 450 MHz at U-NII bands (excluding outdoor bands). Initially, network operators were concerned about the availability and quality of a license-free (exempt) spectrum and possible negative impacts on user experience; however, unlicensed technologies (such as Wi-Fi) continue to provide stable and effective connectivity even under congested and hostile scenarios.

Unlike cellular technologies, the vast majority of existing Wi-Fi products are based on ad hoc deployments. Wi-Fi networks use Carrier Sense Multiple Access with Collision Avoidance (CSMA/CA) and contention-free (Point Coordination Function (PCF) or Distributed Coordination Function (DCF)) Medium Access Control (MAC) protocols specifically designed to enable ad hoc deployment. Ad hoc deployments reduce the network operator's burden for network planning, deployment and maintenance.

Still further, cellular technologies which were initially designed to support more egalitarian business models (e.g., provide a large number of subscribers with relatively low rate voice capability), Wi-Fi technology was designed to support high throughput from conception. Existing Wi-Fi devices are commonly capable of data rates in excess of 300 Mbits/sec; future revisions promise Gbits/sec data rates.

Wi-Fi technology and devices have been manufactured for more than a decade, and the components were commoditized and available at a relatively low cost. Many existing consumer devices already incorporate Wi-Fi technology, thus the minimal cost of equipment (for both network operators and subscribers) does not present any significant hurdle to deployment.

For at least the aforementioned reasons, so-called "Tier 1" operators (e.g., AT&T® and Verizon®) have requested Wi-Fi integration with the Core Network in recent and future standards development (e.g., Release 12 of the $3^{rd}$ Generation Partnership Project (3GPP)). Specifically, network operators have concluded that Wi-Fi may have potential applicability as a complementary communication system for: (a) offloading data traffic and (b) improving coverage. More directly, Wi-Fi offloading can alleviate traffic congestion since the available spectrum for Wi-Fi exceeds the network operator's spectrum. Furthermore, Wi-Fi is more cost effective and does not require network planning and operation for "difficult to cover" areas (e.g., indoors), when compared to small cell solution equivalents. To these ends, many newer small-cell base stations (so-called "NodeB" for 3G and evolved NodeB (eNodeB or eNB) for 4G LTE) have incorporated Wi-Fi Access Point (AP) capability.

However, existing solutions suffer from multiple implementation problems. Currently cellular networks that offer Wi-Fi services treat the cellular and Wi-Fi networks as two separate business units, with the two networks operated and managed separately. From an implementation point of view, there is little to no integration and interworking between the two networks at operation and services levels. Additionally, Wi-Fi networks suffer from a lack of a standard "discovery", "selection" and access mechanisms and procedures. For this reason, the subscriber usually has great difficulty finding and using such networks, and even once found the Quality of Service (QoS) services and policies are not consistent or guaranteed across networks. Inconsistent service provisioning is readily perceptible by subscribers, and can negatively impact customer satisfaction.

As previously noted, Wi-Fi networks are based on web-based authentication methods such as WISPr (or similar variant) which is based on the traditional user name/password paradigm. Despite several major hurdles to implementing subscriber identity module (SIM) operation with Wi-Fi (e.g., support of Extensible Authentication Protocol Authentication Key Agreement (EAP-AKA)), some operators (such as Swisscom®) have used Wi-Fi SIM/USIM based authentication. Similarly, Cisco® has proprietary solutions (e.g., based on the Aggregation Services Router (ASR) series of products and Cisco Prime® for network management), as do Alcatel-Lucent® (e.g., Light Radio a Wi-Fi/WLAN Gateway) and Ericsson® (e.g., Service-Aware Charging and Control (SACC)) and its Network Integrated Wi-Fi solution as an Wi-Fi offloading solution).

Nevertheless, even in these solutions the Wi-Fi network is a separate entity from the cellular network. This distinction leads to different security levels and user experiences, and often requires the operator to manage two separate and distinct networks with additional investment in a number of network and interworking entities. For instance, depending on the solution there may be requirements for new or modified handset functional entities such as EAP-SIM and EAP-AKA for Wi-Fi and routing algorithms (such as client-based IP Flow Mobility and Seamless Offload (IFOM)).

A brief history of the evolution of Wi-Fi Cellular interoperation is presented. In 3GPP Release 6, Interworking-WLAN (I-WLAN) standards were introduced primarily for Wi-Fi integration with 3G networks. This early standard supported IP data through either Wi-Fi or 3G networks, and required a number of new network entities (e.g., Wireless Local Area Network (WLAN) Access Gateway (WAG), Packet Data Gateway (PDG), Authentication Authorization and Accounting (AAA) Server and Home Agent (HA)). Although this standard was not embraced by network operators, I-WLAN was even more tightly integrated in 3GPP Release 8 with the Long Term Evolution (LTE) Core Network (also referred to as the Evolved Packet Core (EPC)).

FIG. 1 depicts the prior art 3GPP Release 8 network architecture 100. As shown, 3GPP Release 8 introduced three network components in the 3GPP Core Network (EPC), namely: the evolved Packet Data Gateway (ePDG) 102, the Authentication Authorization and Accounting (AAA) Server 104, and the Access Network Discovery and Selection Function (ANDSF) 106. Certain existing network entities in the Wi-Fi network were also modified or adapted to incorporate additional functionality (such as the Mobility/Controller Gateway 108). As shown, the Wi-Fi AP 116 is a conventional IEEE 802.11n AP that conforms to the IEEE 802.11n standard. During operation, the Wi-Fi AP 116 is connected to and controlled by Mobility/Controller Gateway 108, which is integrated with the EPC via the ePDG 102. The UE 114 may also need corresponding functionality to support Client-based Mobile IP and IP Flow mobility for Wi-Fi offloading, as well the capability to support discovery, selection, association, and SIM based authentication and encryption via the Wi-Fi AP 116.

The architecture of FIG. 1 enables so-called "non-trusted access". Specifically, the inclusion of the AAA server 104 (which is also connected to the Home Subscriber Server (HSS) 110) allows SIM-based authentication of a Wi-Fi subscriber device by means of EAP-AKA. The Packet Data Gateway (PDG) (previously introduced in Release 6) was redefined in 3GPP Release 8 as an evolved PDG (ePDG) 102. As shown, the ePDG 102 is connected directly to the Packet Data Network (PDN) Gateway (P-GW) 112 to support IP-mobility for Wi-Fi. In the architecture of FIG. 1, an user equipment (UE) 114 is configured to establish an Internet Protocol security (IPsec) tunnel between itself and the ePDG 102 (the intervening network components are not trusted entities, therefore this scheme provides non-trusted access). Since the intervening network components are not trusted, a UE 114 must establish an IPsec tunnel to the ePDG 102. This can be a significant processing burden, as the ePDG must support and maintain a separate IPsec tunnel for each UE.

3GPP Release 10 kept the network architecture 100 and introduced S2a Based Mobility over General Packet Radio Service (GPRS) Tunneling Protocol (SaMOG) which enabled "trusted" access network operation. Unlike Release 8, in Release 10, a IPsec tunnel is setup between the Wi-Fi AP 116 and the P-GW 112. This configuration alleviates large (bandwidth) IPsec tunnels at the ePDG 102; however, since the IPsec tunnel does not extend to the Wi-Fi radio interface, the air interface has to be protected by another mechanism (e.g., the HotSpot 2.0 (IEEE 802.110 standard).

Within the context of FIG. 1, various offloading algorithms can be used to address different Quality of Service (QoS) requirements for different services and IP mobility. Two features, Multi-Access PDN Connectivity (MAPCON) and IP Flow Mobility (IFOM) are specified in Release 10 for QoS based offloading; network operators may implement either scheme based on e.g., business considerations, etc.

In both MAPCON and IFOM, a unique IP address is assigned to each Protocol Data Network (PDN); each PDN is a specific service network including but not limited to: Internet, IP Multimedia Subsystem (IMS), IPTV, etc. in the current 3GPP architecture. Each PDN is further identified by an Access Point Name (APN). Moreover, all PDNs are handed to a Wi-Fi offloading network or back to the cellular network. MAPCON allows selection of access network based on the PDN QoS requirements or network load. IFOM is a more advanced version of MAPCON, as it allows a given PDN to have several IP flows, further refining and optimizing performance based on QoS. In Release 10, each PDN is associated with two IP addresses, one for cellular and one for Wi-Fi network access, allowing simultaneous access through both networks.

To complete the integration of Wi-Fi with 3GPP cellular networks, a standard automated network "Discovery", "Selection" and "Association", and "Policy Control" framework was required for Wi-Fi networks. The existing network architecture 100 provides the foregoing functionality with the Access Network Discover & Selection Function (ANDSF) 106 and Hotspot2.0. ANDSF provides a Client-Server based policy control solution, Hotpot2.0 provides EAP-SIM and EAP-AKA based authentication with Wi-Fi networks (e.g., discovery, selection and association with the network operator via the Wi-Fi air interface).

Exemplary Wi-Fi Over Long Term Evolution (WoLTEN) Network Architecture—

Despite previous efforts, existing solutions for combining cellular and Wi-Fi ecosystems continue to suffer from a variety of problems. Specifically, the proposed 3GPP solution for cellular/Wi-Fi integration is not "holistic"; the proposed solutions are a patchwork of specialized and/or modified functional entities spread across network elements. The resulting solution is complex, incomplete, impractical, and not scalable. Even after significant investment in one of these relatively complex and expensive solutions, network operators still have to: (i) operate and maintain two different networks, and (ii) resolve different user experiences between the networks (e.g., security and QoS).

Additionally, there are other issues that these solutions do not address. For example, the Release 10 proposal (e.g., SaMOG, MAPCON, IFOM, ANDSF and HotSpot2.0) requires the Wi-Fi network to be a "trusted network". Practical implementations will most likely need to be owned by the network operator. Such limitations (even while not expressly stated) exclude desirable features (e.g., Wi-Fi roaming, neutral host operation, etc.) and limit the deployment scenarios of Wi-Fi networks. In particular, certain independent operators (such as Boingo®) use Wi-Fi to farm out networks in the unlicensed bands.

Current solutions provide some level of integration and coexistence of cellular (e.g., 3GPP) and Wi-Fi networks; however, these solutions are often complicated, expensive and require some effort on the part of the operator to operate and maintain. In fact, within the United States of America (USA), there is only one operator (AT&T) which has adopted the aforementioned network architecture.

To these ends, various embodiments of the present disclosure are directed to methods and apparatus for hybrid access to a core network. Ideal solutions would be seamless and functionally similar in both networks (e.g., user experience, policy control, discovery, selection, association, authentication and QoS, etc.) Additionally, such embodiments should provide means for Wi-Fi roaming, Wi-Fi neutral host capabilities, and IP-mobility while also supporting network handoff for an integrated cellular/Wi-Fi network.

The current approach to Wi-Fi integration relies on incremental changes to the existing 3GPP and Wi-Fi networks e.g., by adding new functional entities while modifying some of the existing ones. In contrast, preferential solutions should build on the existing 3GPP network (i.e., where the 3GPP core network (e.g. EPC in an 4G LTE network) has no or minimal changes), instead modifying functionality at the Wi-Fi AP and UE to achieve the desired level of integration. Accordingly, various solutions are disclosed that modify Wi-Fi AP functionality, along with middle-ware software in the UE, configured to enable total Wi-Fi integration with a 3GPP network (transparently to the end user) with minimal changes in the core network.

While the following discussion is presented within the context of a 3GPP core network providing a 4G-LTE (Frequency Division Duplex (FDD)) network operating in a 3GPP approved FDD licensed-band, it is understood that the described principles may be readily applied to other network technologies by artisans of ordinary skill in the related arts, given the contents of the present disclosure. Other examples of 3GPP network technologies include, without limitation, 3G WCDMA/UMTS/HSPA, 2G and 2.5G GSM-GPRS networks, as well as FDD and TDD cellular systems.

While the following discussion is presented within the context of IEEE 802.11n Access Point (AP) technology, it is understood that the described principles may be readily applied to other network technologies by artisans of ordinary skill in the related arts, given the contents of the present disclosure. Other examples of suitable access technologies include e.g., IEEE 802.11 derivatives such as "b", "g", "a", "ac", Frequency Hopping Spread Spectrum (FHSS), Direct Sequence Spread Spectrum (DSSS) and infrared (IR).

Figure 2:
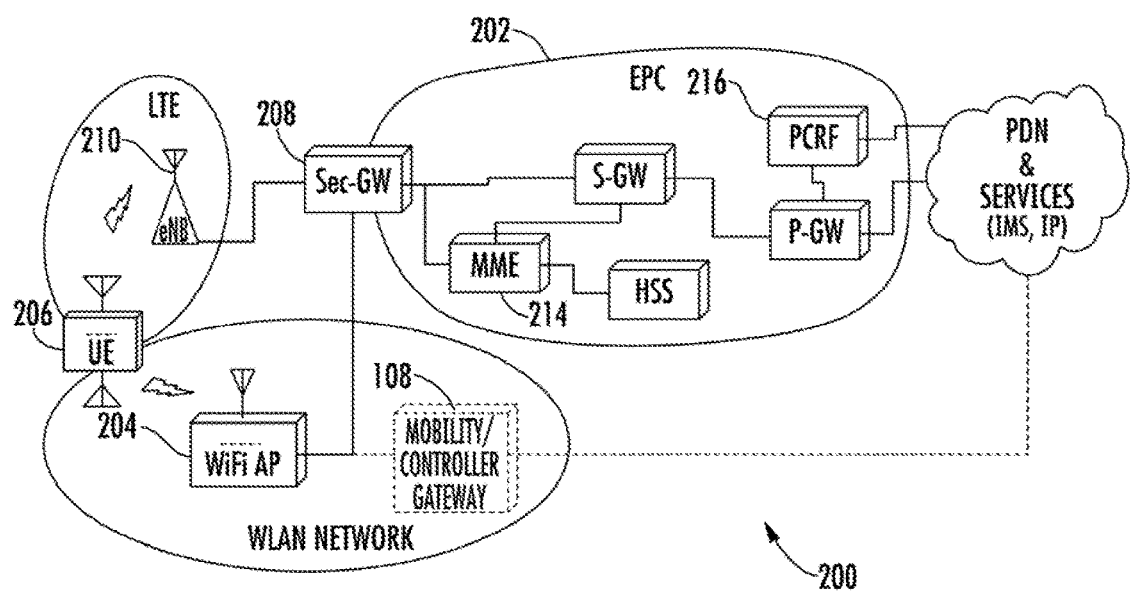
FIG. 2 is a block diagram representation of one exemplary embodiment of a Wi-Fi over Long Term Evolution (WoLTEN) network architecture.

FIG. 2 depicts one exemplary embodiment of network architecture 200 hereinafter referred to as a "WoLTEN network" (Wi-Fi over Long Term Evolution (LTE) Network. In the illustrated embodiment, there is little or no modification required in the evolved Packet Core (EPC) 202; instead, software functionalities of the Wi-Fi AP 204 and UE 206 are configured to accommodate the differences in radio operation (e.g., the differences between the cellular and IEEE 802.11 operation). In the illustrated WoLTEN network, the Wi-Fi AP 204 is connected directly to the Security Gateway 208 of the EPC 202, and is treated as having the same privileges and security as an eNB 210 in the network (i.e. it is a "trusted" AP). In other embodiments (not shown), the Security Gateway 208 is directly connected to a HeNB Gateway or a Local Gateway, or equivalent secure gateway entity. In some variants, the Wi-Fi AP can also be connected to a Mobility/Controller Gateway 212 to function as a conventional Wi-Fi AP (e.g., offering support for legacy devices, etc.). Legacy operation is similar to existing proposals (e.g., see the network architecture 100 of FIG. 1, and is not further described).

During WoLTEN operation, many of the IEEE 802.11n associated lower layers (namely physical (PHY) and medium access control (MAC) layers) remain substantially the same as existing IEEE 802.11n implementations. In some embodiments, the link layer control (LLC) layer is excluded; in other variants the LLC layer may be included. However, various embodiments of the present disclosure enable LTE specific functionality above the MAC layer. Specifically, the subscriber device behaves as a logical LTE user equipment (UE) above the MAC layer; similarly, the Wi-Fi AP behaves as a logical LTE evolved NodeB (eNB) above the MAC layer. By removing the dependency upon lower layer physical functionalities from LTE higher layer functionality, the Wi-Fi offloading algorithms can freely select either radio access technology (e.g., LTE or Wi-Fi) based on relevant considerations e.g., connectivity, power consumption, data requirements, etc.

For example, as described in greater detail hereinafter, the WoLTEN network of FIG. 2 enables authentication with LTE Universal Subscriber Identity Module (USIM) (e.g., based on Extensible Authentication Protocol Authentication Key Agreement (EAP-AKA)) and as such, the Wi-Fi network can operate under an "open system authentication" mode (i.e. the Wi-Fi access does not require credentials for access to the integrated network). Since a single USIM is used for both LTE and Wi-Fi networks, the Wi-Fi offloading selection algorithm can either reside in the UE (UE-based) 206 or in the network (e.g. MME 214) or both, and can be based on a number of considerations such as load and/or radio conditions on each radio access units, Quality of Service (QoS) of the provided service, etc. In one such example, a UE-based algorithm may prefer to use Wi-Fi access, and if Wi-Fi access is not available, then the UE falls back to LTE access.

Moreover, since the Wi-Fi AP 204 is treated as an eNB entity by the WoLTEN network entities, the policy and charging rules function (PCRF) 216 can use the same policies and charging rules for eNB bearers and appropriately enabled Wi-Fi APs. In some embodiments, an operator may prefer to have different policies and charging rules for the two access units (LTE eNBs and Wi-Fi APs).

Exemplary Wireless Router—

As described in greater detail hereinafter (see e.g., Exemplary Subscriber Device, infra), various embodiments of the present disclosure may be used in conjunction with middle-ware software located in the subscriber UE (UE-S) device. In some embodiments, the middle-ware software can be downloaded (e.g., by the user); alternatively, the middle-ware software may be pre-loaded during device manufacture. In still other embodiments, various embodiments of the present disclosure may be used in conjunction with subscriber devices which include specialized hardware to support the appropriate functionality.

Figure 3:
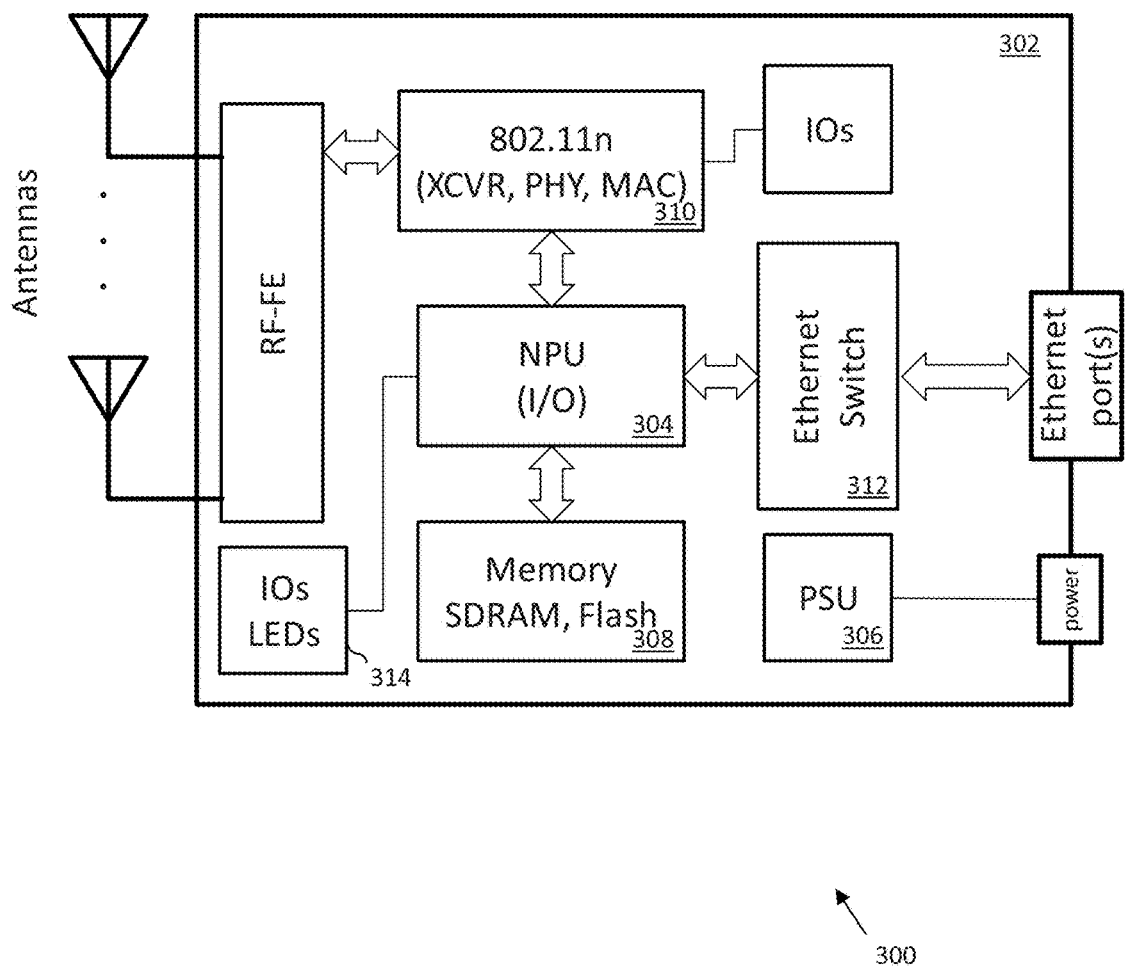
FIG. 3 is a logical block diagram representation of one exemplary wireless router configured to provide hybrid access to a core network in accordance with various principles described herein.

Referring now to FIG. 3, one exemplary wireless router 300 configured to provide hybrid access to a core network is presented.

In one embodiment, the wireless router 300 is a standalone device, however those of ordinary skill in the related arts will recognize that the described functionality may be incorporated in a wide variety of devices including without limitation: a base station (e.g., a Long Term Evolution (LTE) evolved Node B (eNB), etc.), a portable computer, desktop computer, etc.

The exemplary apparatus 300 includes one or more substrates(s) 302 that further include a plurality of integrated circuits including a processing subsystem 304 such as a digital signal processor (DSP), microprocessor, programmable logic device (PLD), gate array, or plurality of processing components as well as a power management subsystem 306 that provides power to the apparatus 300, a memory subsystem 308, and a first radio modem subsystem 310 and an Ethernet switch 312 and associated Ethernet port(s). In some embodiments, user input/output (IO) 314 may also be present.

In some cases, the processing subsystem may also include an internal cache memory. The processing subsystem 304 is connected to a memory subsystem 308 including non-transitory computer-readable memory which may, for example, include SRAM, Flash and SDRAM components. The memory subsystem may implement one or a more of DMA type hardware, so as to facilitate data accesses as is well known in the art. During normal operation, the processing system is configured to read one or more instructions which are stored within the memory, and execute one or more actions based on the read instructions.

The processing system 304 has sufficient processing capability to support the first radio subsystem 310 and core network connectivity simultaneously. In one exemplary implementation, wireless router 300 is configured to provide additional functionality (i.e., Wi-Fi protocol stacks which are modified to support higher layer LTE protocol stacks and control software) running on the processing subsystem 304, beyond existing wireless router functionality (i.e., legacy Wi-Fi operation). In one exemplary embodiment, the processor subsystem 304 is configured to execute software for operation and control of the wireless router. One such commercial example is the Broadcom BCM4705 processor chip (which includes a processor core and a number of IOs such as GPIO, RS232 UART, PCI, GMII, RGMII as well as DDR SDRAM controller).

The illustrated power management subsystem (PMS) 306 provides power to the wireless router 300, and may include an integrated circuit and or a plurality of discrete electrical components. Common examples of power management subsystems 306 include without limitation: a rechargeable battery power source and/or an external power source e.g., from a wall socket, inductive charger, etc.

The user IO 314 includes any number of well-known IO including, without limitation: LED lights, speakers, etc. For example, in one such case, a set of LEDs can be used to indicate connection status (e.g., "green" indicates an online status, "red" indicates a malfunction or connectivity issue, etc.). In more complex embodiments, the IO may incorporate a keypad, touch screen (e.g., multi-touch interface), LCD display, backlight, speaker, and/or microphone or other IOs such as USB, GPIO, RS232 UART, PCI, GMII, RGMII.

The first radio subsystem is 310 is configured to generate a wireless network that accepts one or more subscriber devices. In one exemplary embodiment, the generated wireless network is an "open" network i.e., the generated wireless network does not require any access control measures (e.g., authentication, authorization, or accounting, etc.). While open network operation is described herein, it is appreciated that access control schemes need not be open; limited access, and closed access may be used with equal success. In fact the credentials for wireless radio subsystem 310 can be entered and set via the Ethernet switch 312 and associated Ethernet port that connects to the core network (as described in greater detail hereinafter). In some cases, the open networks may incorporate so-called "ad hoc" networking, mesh networking, etc.

The first radio subsystem is configured to generate a wireless network. In one exemplary embodiment, the first radio subsystem generates a Wi-Fi network (based on IEEE e.g., 802.11n, etc.) Other examples of suitable wireless technologies include, without limitation, Bluetooth, WiMAX, etc.

As shown in FIG. 3, there are several (2 or more) antennas to support Multiple Input Multiple Output (MIMO) operation of the first network. While not expressly shown, it is appreciated that each RF frontend includes e.g., filters, duplexers, RF switches, RF signal power level monitoring, LNA (Low-Noise Amplifier) and PAs (Power Amplifier) that may be required for the device's radio subsystem. In one exemplary embodiment, the first radio subsystem 310 includes the functionalities needed to configure and operate an IEEE 802.11n modem, including the transceiver part, PHY (physical layer) and MAC (Media Access Controller) units, as well as the associated control and operation software. One commercial example of such a RF frontend is the Broadcom IEEE 802.11n single chip product, BCM4322 or BCM4323.

The Ethernet switch 312 and associated Ethernet port(s) are configured to provide access to the Core Network (e.g., EPC 202), and potentially other network entities (e.g. eNBs, HeNBs, etc.). Other common forms of access include, for example, Digital Subscriber Line (DSL), T1, Integrated Services Digital Network (ISDN), satellite link, Data Over Cable Service Interface Specifications (DOCSIS) cable modem, etc. One commercial example of an Ethernet switch 312 is the Broadcom BCM53115 chip which provides up to five (5) Ethernet ports. In one exemplary embodiment, the wireless router is configured to directly connect to the core network of a network operator to enable the aforementioned WoLTEN operation, via the Ethernet switch 312.

Exemplary Subscriber Device—

Figure 4:
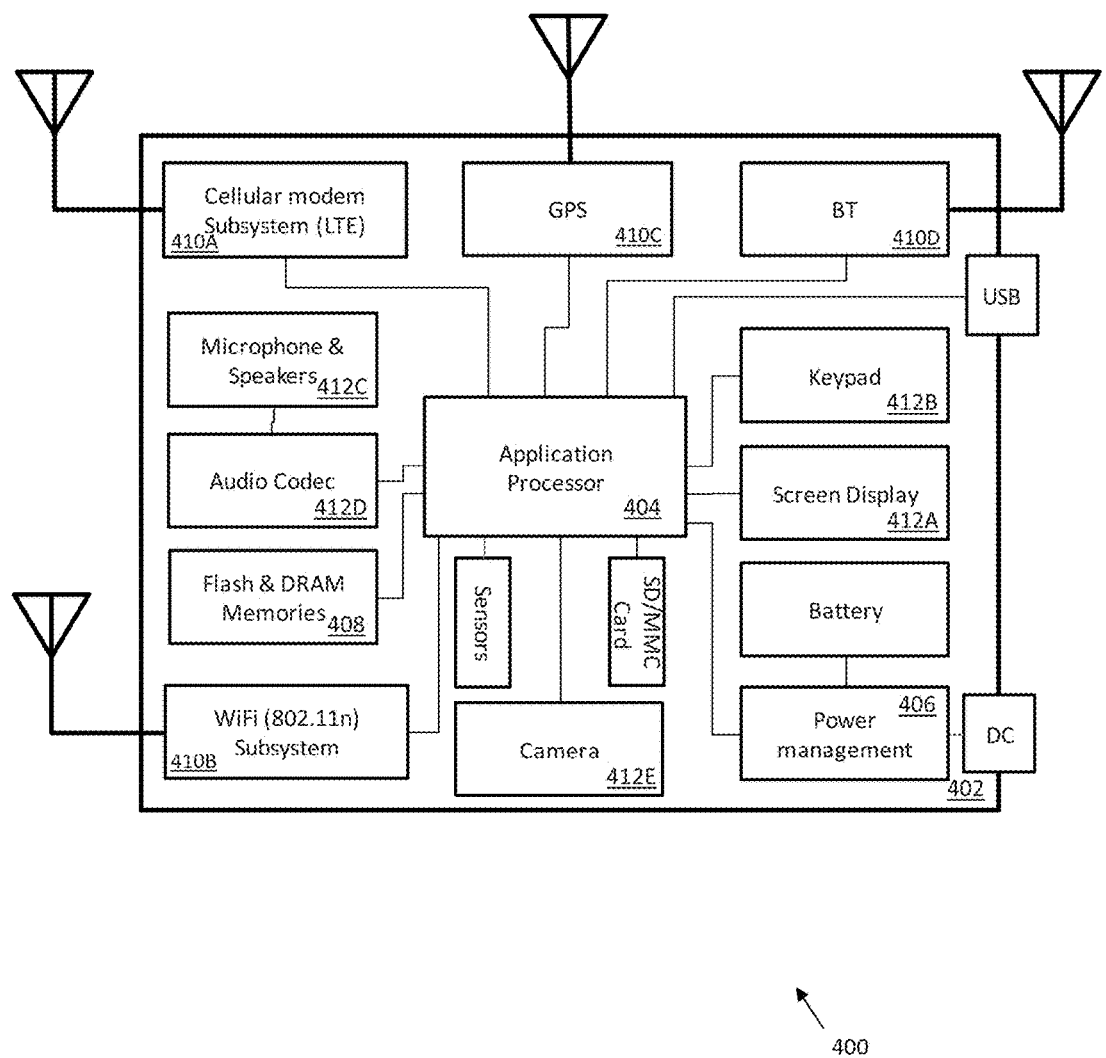
FIG. 4 is a logical block diagram representation of one exemplary subscriber device configured to access a core network via a hybrid access scheme in accordance with various principles described herein.

Referring now to FIG. 4, one exemplary subscriber device 400 configured to access a core network via a hybrid access scheme (via the wireless router 300 of FIG. 3). In one embodiment, the subscriber device 400 is a dedicated device, however those of ordinary skill in the related arts will recognize that the described functionality may be incorporated in a wide variety of devices including without limitation: a smartphone, portable computer, desktop computer, and even standalone devices with only one radio modem for Wi-Fi IEEE 802.11n communications, etc.

The exemplary apparatus 400 includes one or more substrates(s) 402 that further include a plurality of integrated circuits including a processing subsystem 404 such as a digital signal processor (DSP), microprocessor, programmable logic device (PLD), gate array, or plurality of processing components as well as a power management subsystem 406 that provides power to the apparatus 400, a memory subsystem 408, and one or more radio modem subsystems. As shown, the exemplary apparatus includes four (4) radio modem subsystems: a LTE cellular air-interface 410A, a Wi-Fi IEEE 802.11n air-interface 410B, GPS air-interface 410C, and a Bluetooth air-interface 410D. In some embodiments, user input/output (IO) 412 may also be present. As shown, the exemplary user input/output (IO) 412 includes: a screen display 412A, a keypad 412B, a microphone and speaker 412C, an audio codec 412D, and a camera 412E. Other peripherals may include external media interfaces (e.g., SD/MMC card interfaces, etc.) and/or sensors, etc.

In some cases, the processing subsystem may also include an internal cache memory. The processing subsystem 404 is connected to a memory subsystem 408 including non-transitory computer-readable memory which may, for example, include SRAM, Flash and SDRAM components. The memory subsystem may implement one or a more of DMA type hardware, so as to facilitate data accesses as is well known in the art. During normal operation, the processing system is configured to read one or more instructions which are stored within the memory, and execute one or more actions based on the read instructions.

As with the processing subsystem 304 of the wireless router 300 (see FIG. 3), the processing system 404 of FIG. 4 (also referred to as the "application processor") has sufficient processing capabilities and access to memory components to at least support the Wi-Fi radio subsystems 410B and core network connectivity simultaneously. One commercial example of a processing system 404 is the Freescale iMX53 1 GHz ARM Cortex-A8 Processor or QUALCOMM Snapdragon 800.

The illustrated power management subsystem (PMS) 406 provides power to the subscriber device 400, and may include an integrated circuit and or a plurality of discrete electrical components. Common examples of power management subsystems 406 include without limitation: a rechargeable battery power source and/or an external power source e.g., from a wall socket, induction charger, etc.

The user IO 412 may include any number of well-known IO common to consumer electronics including, without limitation: a keypad, touch screen (e.g., multi-touch interface), LCD display, backlight, speaker, and/or microphone or USB and other interfaces.

Those of ordinary skill in the related arts will appreciate that the subscriber device may have multiple other components (e.g., multiple additional radio subsystems, graphics processors, etc.), the foregoing being merely illustrative.

The cellular radio subsystem 410A is configured to join a cellular network provided by a network operator. In one embodiment, the cellular radio subsystem 410A is a Fourth Generation (4G) Long Term Evolution (LTE) modem. While not expressly shown, it is appreciated that each RF frontend includes e.g., filters, duplexers, RF switches, RF signal power level monitoring, LNAs, and PAs, that may be required for the device's radio subsystem. The subscriber device 400 is associated with an identification module that verifies the subscriber device to the network operator. Generally, the identification module securely identifies the subscriber device (or subscriber account associated with the device) as being authentic and authorized for access. Common examples of identification modules include, without limitation, SIM, USIM, RUIM, CSIM, etc. In some cases, the identification modules may be removable (e.g., a SIM card), or alternatively an integral part of the device (e.g., an embedded element having the identification module programmed therein). One commercial example of a cellular radio subsystem 410A is the QUALCOMM Gobi MDM9600 and its associated RF and peripheral chips.

The Wi-Fi radio subsystem 410B is configured to join a wireless network generated e.g., by the wireless router 300 of FIG. 3. In one embodiment, the wireless network radio subsystem 410B is an IEEE 802.11n compliant modem. While not expressly shown, it is appreciated that each RF frontend includes e.g., filters, duplexers, RF switches, RF signal power level monitoring, LNAs, and PAs, that may be required for the device's radio subsystem. In one exemplary embodiment, the Wi-Fi radio subsystem 410B is configured to execute software for operation and control of the IEEE 802.11n PHY (physical layer) and MAC (Media Access Controller) units, as well as the associated control and operation software. One commercial example of a Wi-Fi radio subsystem 410B is the Atheros single chip IEEE 802.11n product, AR9285.

In one exemplary implementation, the subscriber device 400 is further configured to provide additional functionality (i.e., Wi-Fi protocol stacks which are modified to support higher layer LTE protocol stacks and control software) running on the processing subsystem 404.

Exemplary "Wi-Fi PIPE"—

Figure 5:
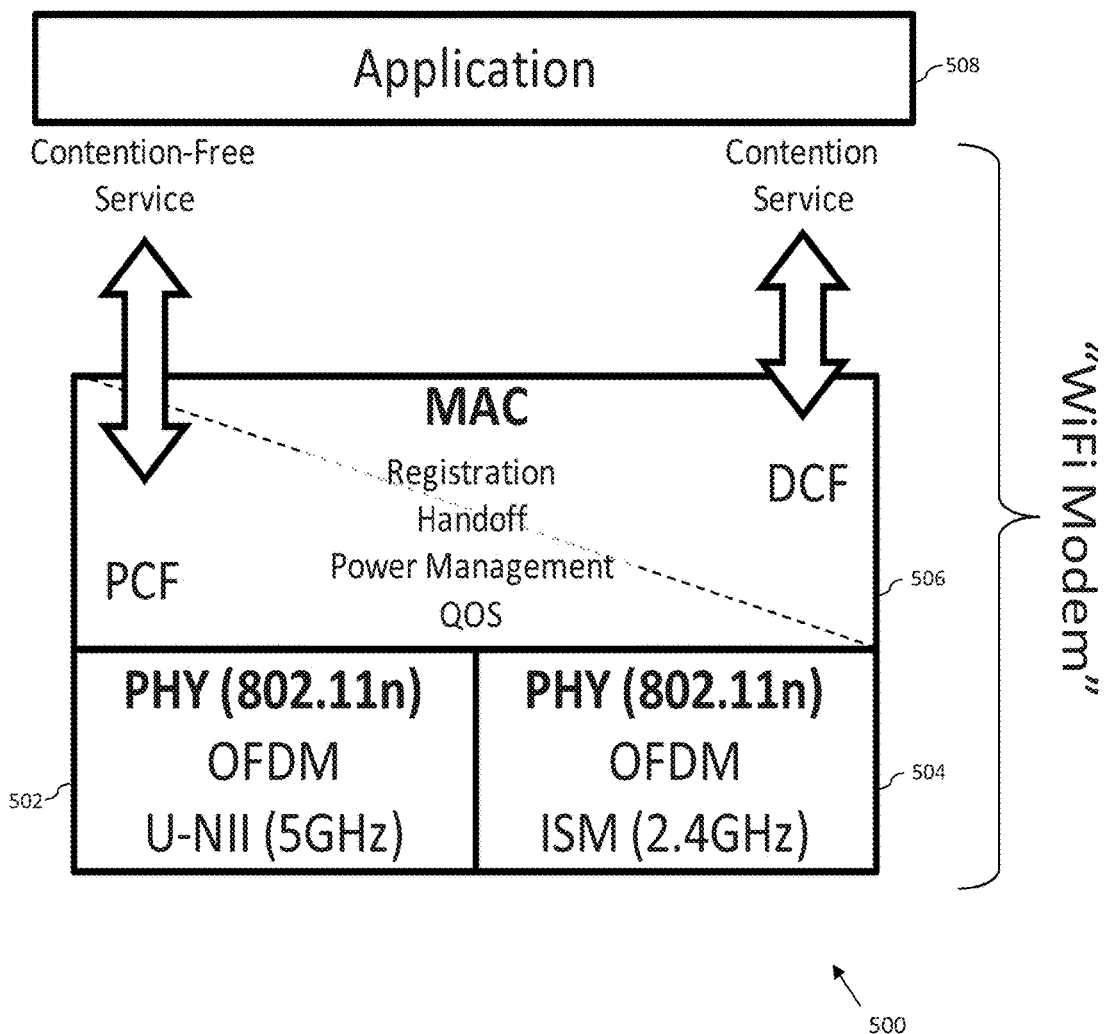
FIG. 5 is a logical block diagram representing a IEEE 802.11n PHY (L1) and MAC (L2) protocol stack useful in conjunction with various aspects of the present disclosure.

FIG. 5 illustrates a logical block diagram representing a IEEE 802.11n PHY (L1) and MAC (L2) protocol stack 500 useful in conjunction with various aspects of the present disclosure. As shown, the application software 508 operates directly above the MAC layer 506. It is appreciated that other variants may incorporate other software layers (e.g., a Logical Link Control (LLC) and/or IP layer) based on design considerations. The illustrative PHY can operate in either the U-NII band 502 or ISM band 504, or both at the same time.

The MAC layer 506 can either be set to operate in the "Contention" or "Contention-Free" mode. In contention free operation, the MAC uses a Point Coordination Function (PCF); during contention mode operation, the MAC uses a Distributed Coordination Function (DCF). Other Wi-Fi MAC functions include registration, hand-off, power management, security and Quality of Service (QoS). Where not otherwise stated herein, existing Wi-Fi components and functionality are well understood within the related arts and not discussed further.

Figure 6:
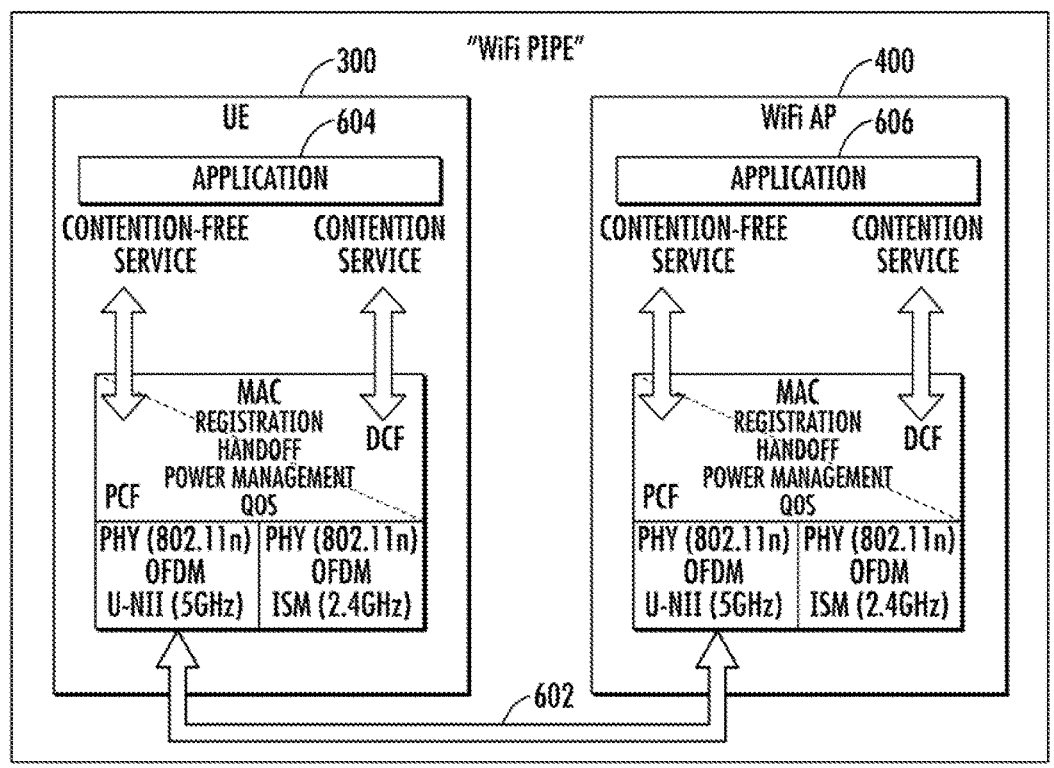
FIG. 6 is a logical representation of the Wi-Fi PIPE formed by the exemplary wireless router (e.g., as described in FIG. 3) and the exemplary subscriber device (e.g., as described in FIG. 4).

Referring now to FIG. 6, consider the exemplary wireless router 300 (e.g., as described in FIG. 3 and discussion supra) and the exemplary subscriber device 400 (e.g., as described in FIG. 4 and discussion supra). Once the exemplary subscriber device 400 enters the exemplary network agnostic wireless router 300 coverage area and registers with the open network, the end-to-end MAC connection between the subscriber device 400 and the wireless router 300 forms a "transparent" connection pipe (or access tunnel) which is termed hereafter a "Wi-Fi PIPE" 602. In some embodiments, the Wi-Fi PIPE tunnel itself is unsecure (e.g., where the hotspot behaves as an "open" Wi-Fi network), and the underlying data payloads may be protected according to existing encryption schemes used end-to-end for the cellular (LTE) network or/and at application layer, etc. such as those used over traditional untrusted networks. In other embodiments, The Wi-Fi PIPE is implemented via a closed network and incorporates native encryption, etc. (Wired Equivalent Privacy (WEP), Wi-Fi Protected Access (WPA), WPA2, etc.).

The Wi-Fi PIPE enables the two logical endpoints running a first application 604 and a second application 606 (respectively) to communicate directly without any intervening translation (i.e., data transfers are not modified). The logical endpoints are unaware of the underlying physical and data link transactions which are occurring in their respective Wi-Fi interfaces. In one exemplary embodiment, the first application 604 is coupled to the subscriber device's software stack, and the second application 606 is coupled to the wireless router's software stack (not shown). In other words, the Wi-Fi PIPE enables the subscriber device's stack (the SIM/USIM card on the subscriber device 700) to directly connect to the wireless router's stack (on the wireless router 300).

Figure 7:
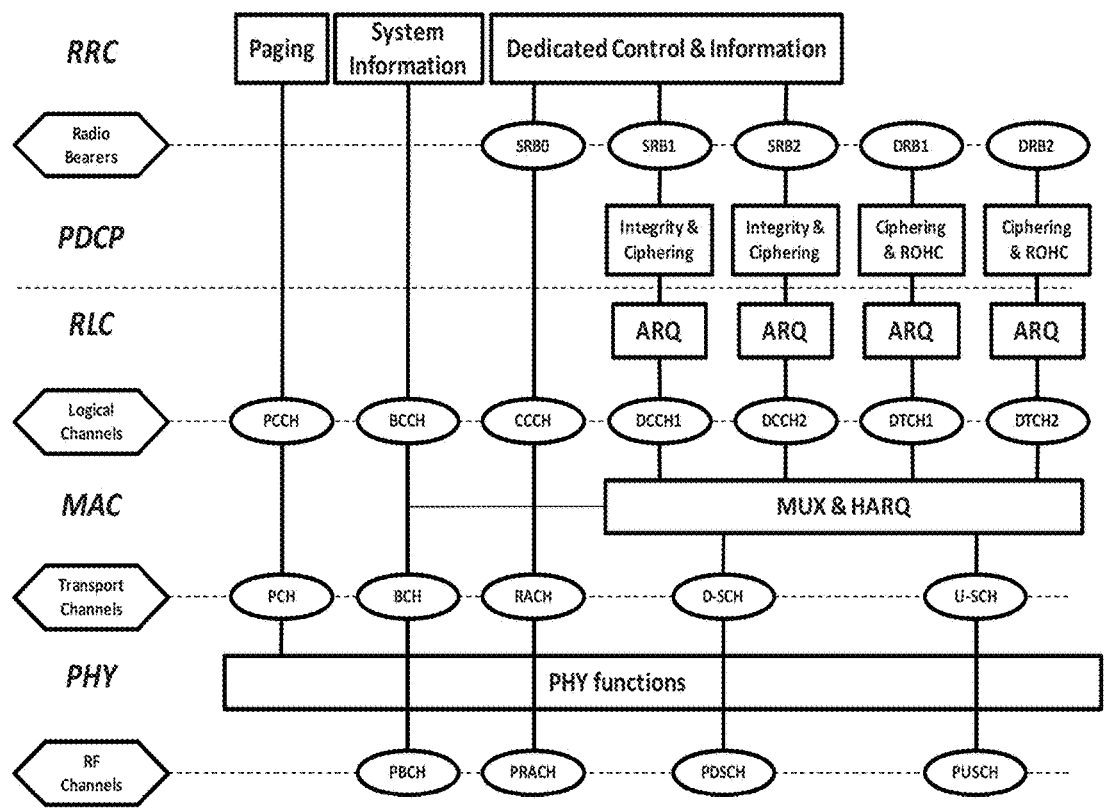
FIG. 7 is a logical software diagram representation of several of the Logical, Transport and Physical channels of prior art LTE radio architectures.
Figure 8:
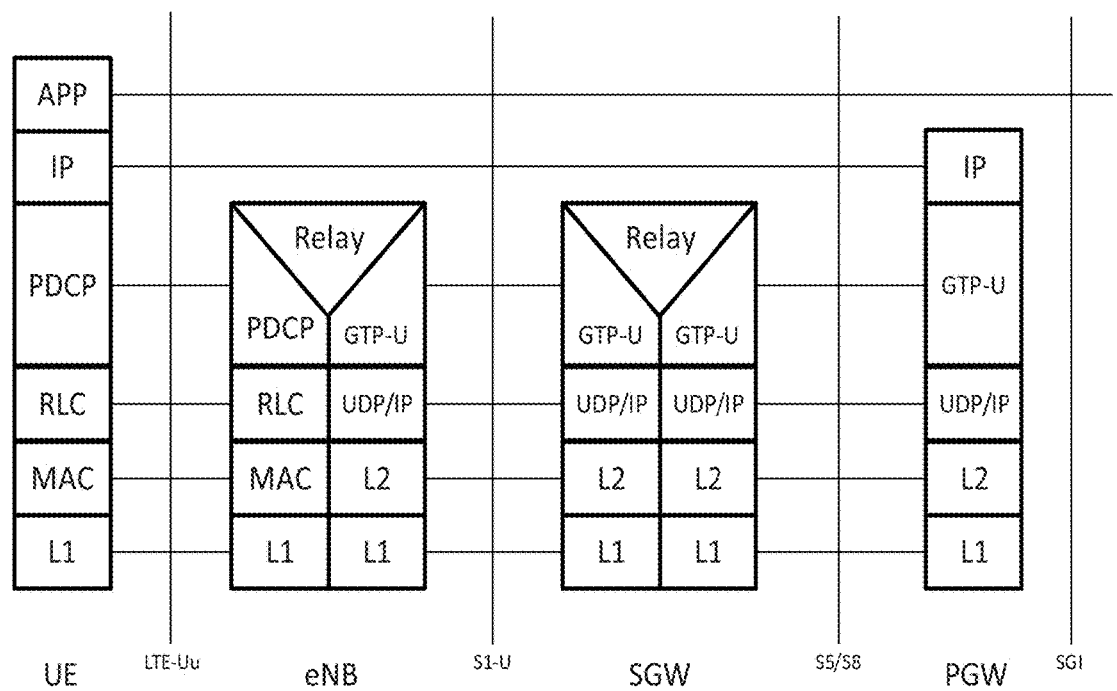
FIG. 8 is a logical software diagram representation of a prior art LTE software user-plane protocol stack.
Figure 9:
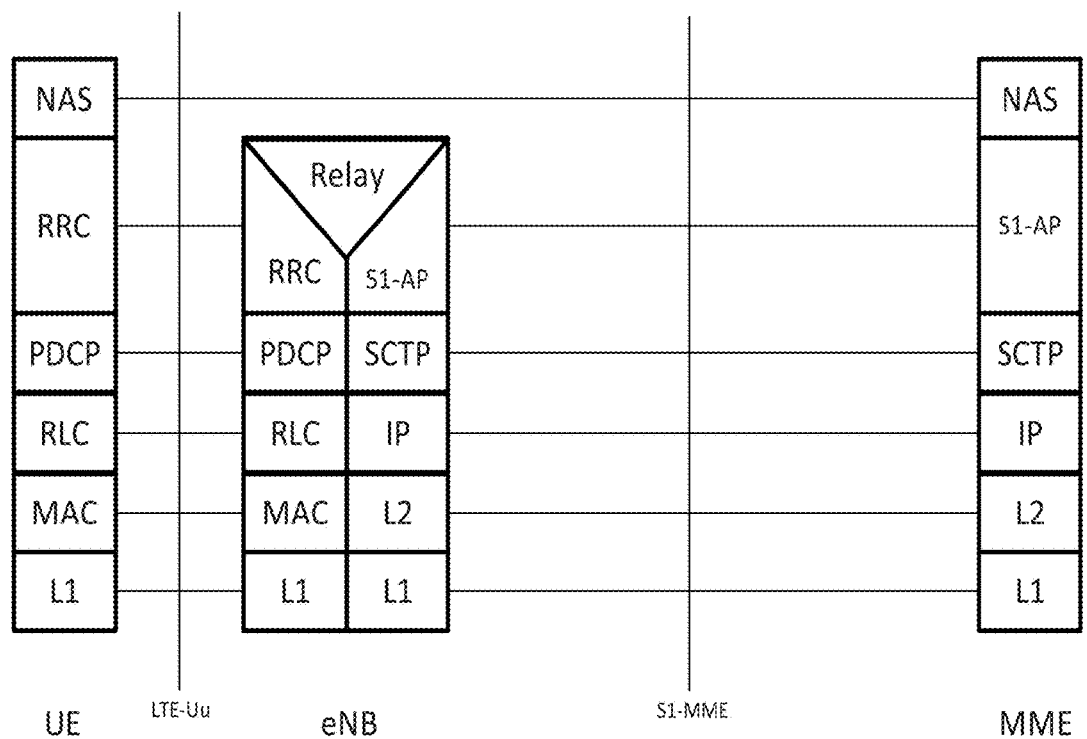
FIG. 9 is a logical software diagram representation of a prior art LTE software control-plane protocol stack.

As previously noted (e.g., as described in FIG. 2 and discussion supra), the wireless router is connected to the evolved packet core (EPC) (via e.g., the Security-Gateway 208) directly. In one exemplary embodiment, the wireless router is configured to use all or some of the existing eNB LTE software structures and entities (e.g., logical channels, protocols and software stack, RRM etc) for communicating and/or interacting with the LTE EPC and UE. For example, FIG. 7 illustrates several of the Logical, Transport and Physical channels of prior art LTE radio architectures, along with the respective protocol stack layers. FIG. 8 illustrates the prior art LTE radio user-plane protocol stack that operates between the user equipment (UE), evolved NodeB (eNB), Serving Gateway (SGW), and PDN Gateway (PGW). FIG. 9 depicts the prior art LTE control-plane protocol stack for between the UE, eNB and Mobility Management Entity (MME). Yet other physical and/or logical entities (such as a Radio Resource Manager (RRM), etc.) may be useful for eNB operation, the inclusion or exclusion of such entities being within the skill of artisans in the related arts given the contents of the present disclosure.

It is relatively straightforward for the wireless router to communicate on the network side with e.g., the SGW and MME. For example, during operation, the wireless router 300 configures its Ethernet interface and executes a communication protocol as a logical eNB, thereby seamlessly integrating with the existing LTE network architecture. Specifically, on the user-plane, the wireless router 300 appears as an eNB to the EPC and communicates with the SGW using the protocols used between eNB and SGW (e.g., the General Packet Radio Service (GPRS) Tunneling Protocol (GTPU)); communication is performed over user datagram protocol (UDP) internet protocol (IP) (via the wireless router's 300 Ethernet interface 312). On the control-plane side, the wireless router 300 communicates with the MME using the protocols used between eNB and MME (e.g., the S1-AP over Stream Control Transmission Protocol (SCTP)); communications are performed over IP. While the foregoing example is presented with respect to the wireless router's Ethernet interface, it is appreciated by those of ordinary skill in the related arts that the user-plane and control-plane communications may be performed over other interfaces (e.g., over any MAC (L2) and physical (L1) layer that is used for the backbone network between the wireless router and the EPC), given the contents of the present disclosure.

Figure 10:
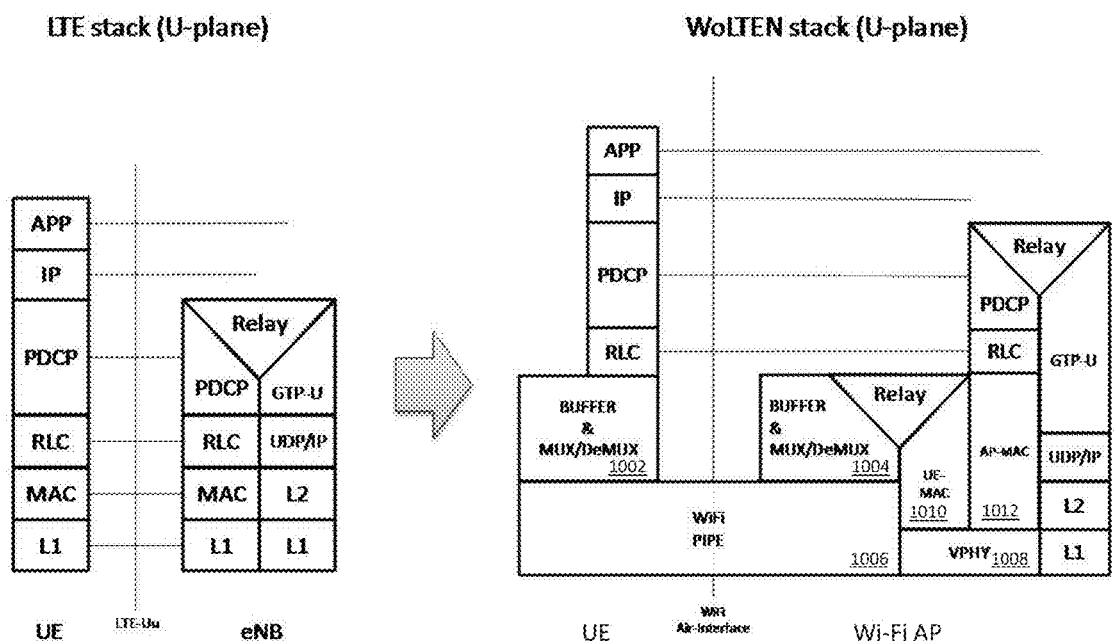
FIG. 10 is a logical software diagram illustrating one exemplary embodiment of a LTE radio user-plane protocol stack that operates between the user equipment (UE) and evolved NodeB (eNB), and a modification thereof, in accordance with various aspects of the present disclosure.
Figure 11:
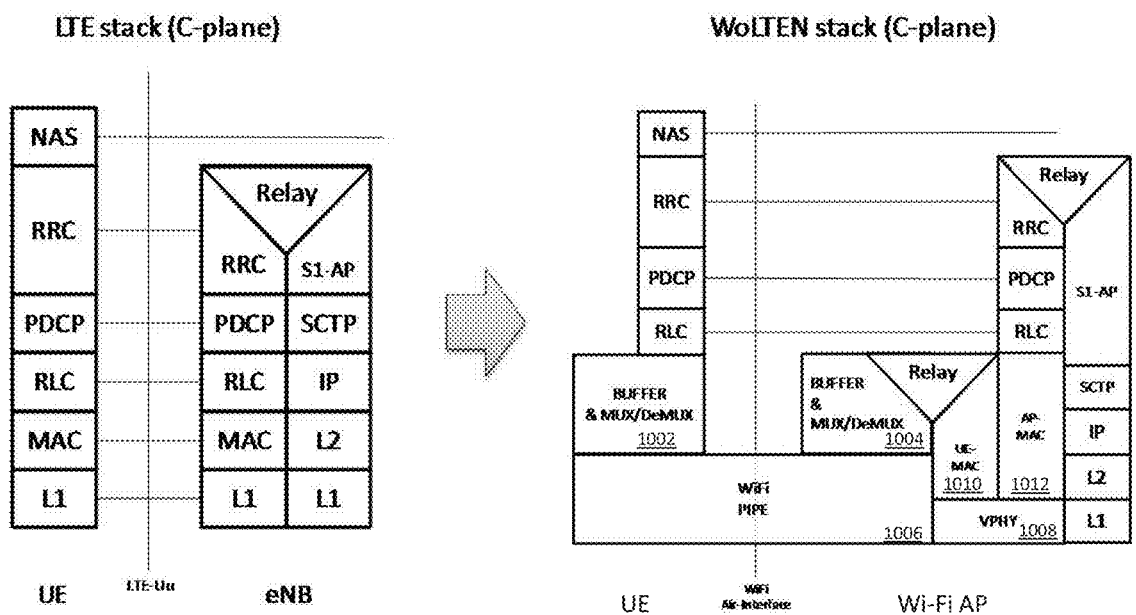
FIG. 11 is a logical software diagram illustrating one exemplary embodiment of the LTE radio control-plane protocol stack that operates between the user equipment (UE) and evolved NodeB (eNB), and a modification thereof, in accordance with various aspects of the present disclosure.

The interface between the exemplary subscriber device and exemplary wireless router (e.g., analogous to the eNB-UE interface, via the Wi-Fi air interface) requires modification to handle the differences introduced by Wi-Fi modem operation. For example, FIG. 10 illustrates one exemplary embodiment of the LTE radio user-plane protocol stack that operates between the user equipment (UE) and evolved NodeB (eNB), and the modification to support the exemplary subscriber device and exemplary wireless router, in accordance with the principles described herein. FIG. 11 illustrates one exemplary embodiment of the LTE radio control-plane protocol stack that operates between the user equipment (UE) and evolved NodeB (eNB), and the modification to support the exemplary subscriber device and exemplary wireless router, in accordance with the principles described herein.

As shown, in both FIGS. 10 and 11, the exemplary hybrid Wi-Fi PIPE protocol stack operates beneath the Radio Link Control (RLC) layer, and which has replaced the LTE MAC and L1 layers with corresponding Buffer and MUX/DeMUX assemblies (1002, 1004), Wi-Fi PIPE 1006, and virtualized PHY 1008, user equipment (UE) MAC 1010 and access point (AP) MAC 1012.

In one implementation, the Wi-Fi PIPE is coupled to First-In-First-Out (FIFO) data buffers on both sides (e.g., at the subscriber device 400 and the wireless router 300) to handle time of arrival issues (e.g., jitter) which might otherwise cause scheduling problems for the Wi-Fi PIPE or LTE operation. In multiple user embodiments, the router may incorporate multiple buffers corresponding to each user, a single buffer which is divided into multiple partitions for each user, etc.

There is one RLC entity for each radio bearer; this enables multiple radio bearers to isolate radio bearer performance. The LTE RLC is configured to disassemble (and re-assemble) data packets from (and to) the Packet Data Convergence Protocol (PDCP) layer into manageable sizes for the Wi-Fi PIPE. The LTE RLC is further configured to ensure that all received packets are in order before passing them to the PDCP layer. In the event that a packet is lost, the LTE RLC layer can perform re-transmission to recover lost packets by initiating Automatic Repeat Request (ARQ) procedures.

There is one PDCP entity per radio bearer (which ensures isolated radio bearer performance). The LTE PDCP entity is configured to provide the ciphering (and integrity) protection (over untrusted connections, such as the Wi-Fi PIPE). The LTE PDCP is further configured to provide Robust Header Compression (ROHC) which may reduce the overhead of transmitting small packets (further improving Wi-Fi PIPE performance). Finally, the PDCP entity can provide reordering and re-transmission of packets during hand-off operation.

Even though the Wi-Fi PIPE 1006 and corresponding Buffer and MUX/DeMUX assemblies (1002, 1004) enable a Wi-Fi radio link between the exemplary subscriber and the exemplary wireless router, the higher layers (e.g., the RLC, PDCP, RRM etc.) are handled with existing LTE implementations, thus the virtualized PHY 1008, UE MAC 1010 and AP MAC 1012, ensure that the LTE based higher layers are unaware of the Wi-Fi radio link operation. More directly, the UE MAC 1010 is emulated on the wireless router 300, which communicates with a virtualized PHY 1008 (VPHY) to pass the emulated MAC PDUs with minimum meditation to the wireless router's AP MAC 1012. Many LTE PHY operations are unnecessary, and thus the VPHY may effectively "bypass" or "fake" the extraneous PHY operations for correct operation of the UE MAC 1010 and AP MAC 1012. For example, procedures such as e.g., the Random Access Channel (RACH), Timing Advance (TA), etc. associated with physical layer operation are no longer needed.

Figure 12:
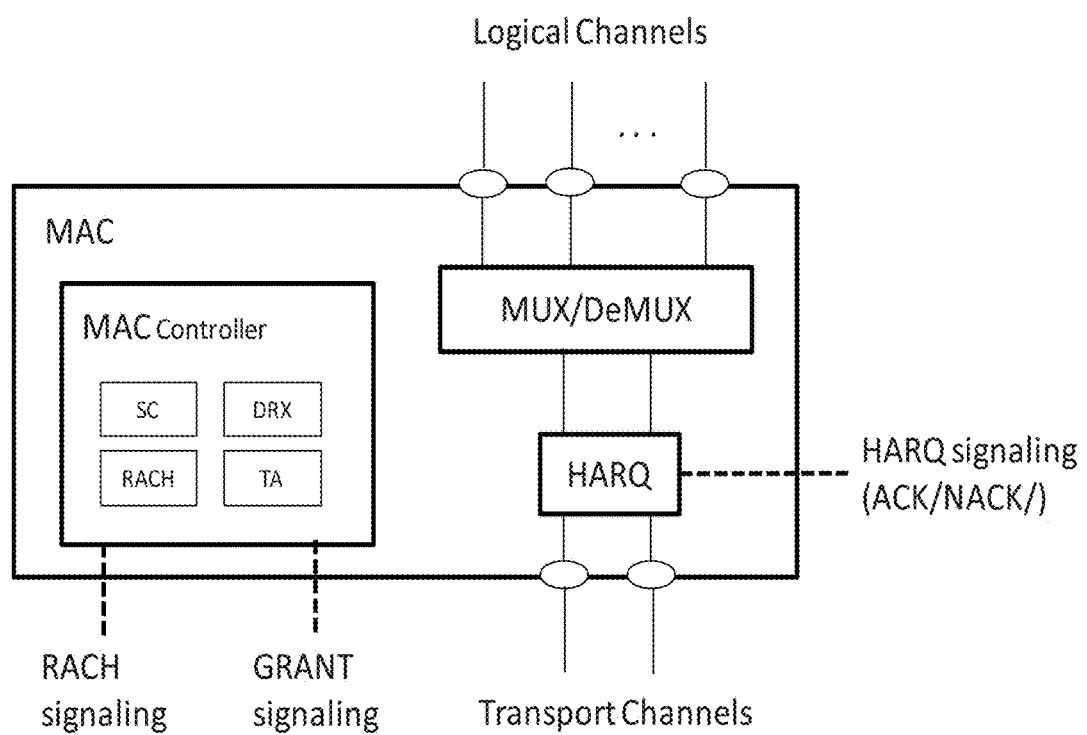
FIG. 12 is a logical software diagram illustrating one exemplary embodiment of a conceptual architecture of the LTE MAC, useful in conjunction with various aspects of the present disclosure.

In some cases, the VPHY, UE MAC 1010 and AP MAC 1012 can be further optimized (since there is no actual physical propagation channel), as a "thin MAC" which performs the minimal formatting and translation functionality needed for successful interoperation of the Wi-Fi PIPE with the higher layers. For example, FIG. 12 depicts a conceptual architecture of the LTE MAC (UE-side) (the LTE MAC on the eNB side has similar functionality). The MAC controls operations such as RACH, TA, scheduling of channels and discontinuous reception/transmission (DRX/DTX). These functions are handled entirely within the VPHY and can be disabled or omitted (the appropriate signal or command is not performed) or "faked" (the appropriate signal or command is generated at the appropriate times to indicate success, thereby enabling processing to continue). For example, uplink and downlink resource grant signaling can be "faked" with VPHY logic that mimics physical signaling indicating that resources are always available. Downlink Hybrid Automatic Repeat Request (HARQ) can be omitted as the data packets are handled within the VPHY (which is substantially error and loss free). Similarly, uplink HARQ can be disabled as data packet errors and losses are handled before the UE MAC (e.g., by the Wi-Fi PIPE). Channel multiplexing and de-multiplexing can also be omitted as the MAC Service Data Units (SDUs) (or Protocol Data Units (PDUs) at the MAC output) can be passed directly between the UE MAC and AP MAC via the VPHY. Other MAC associated functions, including without limitation, buffer status reporting, power headroom reporting, downlink and uplink channel resource scheduling, logical channel prioritization, etc. can also be optimized and/or omitted.

The foregoing discussion of the exemplary "thin MAC" and VPHY ("Virtual" PHY) is based on the use of e.g., counters, key performance indicators (KPIs) and control information that is provided from lower layers to higher layers to ensure correct operation of the LTE protocol stack. It is appreciated that some embodiments may not need the "thin MAC" or VPHY emulation (e.g., proprietary implementations, future enhancements to existing implementations, extremely optimized implementations, specialized use cases, etc.) in which case, the RLC entities at each end can pass their frames to each other over the Wi-Fi PIPE directly.

While the foregoing discussion is presented with Wi-Fi PIPE functionality at the MAC and L1 layers, it is appreciated that other embodiments may implement equivalent operations at any layer of the subscriber device and/or wireless router device.

The foregoing discussion is based on the Wi-Fi PIPE data throughput being sufficiently larger than the data throughput required by the LTE network to support all users in the coverage area. While the foregoing assumption is generally true, it is appreciated that where the LTE network operates at a faster speed than the Wi-Fi interface, the Wi-Fi PIPE should indicate the available capacity to the LTE network such that the LTE network can make appropriate adjustments to the radio bearers (e.g. resource and bandwidth allocation to each UE MAC is limited). Such scenarios may, for example, occur where the wireless router offers both cellular network connectivity and simultaneous legacy wireless router operation; the two functions may be "capped" at a certain proportion of the routers bandwidth to ensure that both functions are sufficiently supported.

Figure 13:
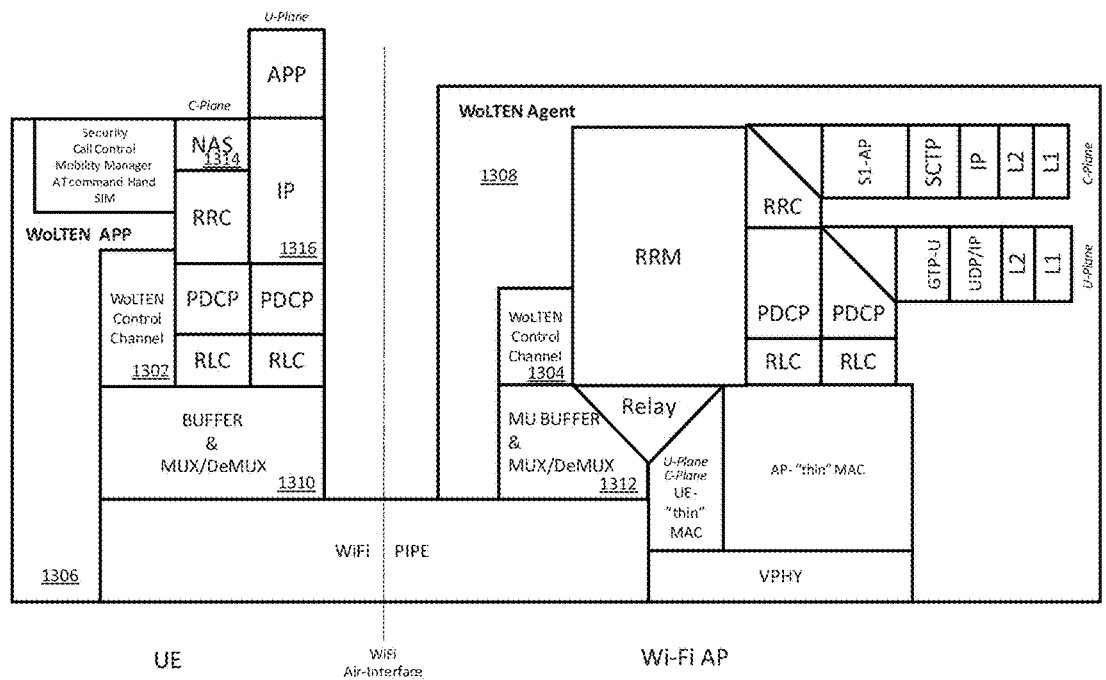
FIG. 13 is a logical software diagram representation of an overall protocol stack architecture (both user-plane and control-plane) for the subscriber device and the wireless router.

Referring now to FIG. 13, the overall protocol stack architecture (both user-plane and control-plane) for the subscriber device and the wireless router is presented. The two-way auxiliary control channels (1302, 1304) and the supporting application and agent (1306, 1308) are collectively called the Wi-Fi over LTE (WoLTEN) protocol stack. As shown, the WoLTEN APP (application) 1306 resides in the subscriber device 400 and includes an LTE stack that supports the radio link control (RLC) layer to non-access stratum (NAS) 1314 for control-plane operations, and RLC layer to internet protocol (IP) 1316 for user-plane operations. The WoLTEN APP 1306 also includes the Buffer and MUX/DeMUX 1310, as well as the WoLTEN Control Channel 1302 and control and operation software. The counterpart WoLTEN Agent 1308 resides in the wireless router 300 and includes LTE UE MAC, VPHY, and LTE AP MAC entities which handle the counterpart control-plane and user-plane for one or more subscriber devices. In one embodiment, the WoLTEN Agent may also include other logical and/or physical entities (such as e.g., a Radio Resource Management (RRM), etc.) to handle additional functionality typically provided by a LTE eNB.

The WoLTEN APP 1306 and WoLTEN Agent 1308 communicate bi-directionally over the WoLTEN Control Channel.

In one embodiment, the WoLTEN APP is a downloadable application (e.g., for purchase) and/or included in the subscriber device during manufacture. Depending on the nature of software implementation and accessibility of $3^{rd}$ party support for the indigenous LTE software, the WoLTEN APP can replace in whole or part, the indigenous LTE protocol stack during operation. For instance, due to security concerns, the WoLTEN APP may have its own copy of the relevant LTE protocol stack; in other embodiments, the WoLTEN APP may be configured to interface with supported LTE protocol stacks.

Referring now to the Buffer and MUX/DeMUX 1310, the Buffer and MUX/DeMUX 1310 is configured to multiplex RLC packets of different signaling radio bearer (SRBs), data radio bearers (DRBs), control-plane, user-plane, and WoLTEN Control Channel packets into a single stream for delivery via the Wi-Fi PIPE in the uplink. On the downlink, the Buffer and MUX/DeMUX 1310 is configured to buffer the incoming data and de-multiplex packets to the appropriate SRBs, DRBs, control-plane, user-plane, and WoLTEN Control Channel.

Similarly, the multiple user (MU) Buffer and MUX/DeMUX 1312 of the WoLTEN Agent is configured to multiplex different users' MAC packets (which includes SRB & DRB), and packets from their corresponding WoLTEN Control Channel into a single stream before buffering and delivering it to Wi-Fi PIPE for transmission to the subscriber. On the uplink, the MUX/DeMUX 1312 is configured to buffer and demultiplex packets (from multiple users) delivered via the Wi-Fi PIPE, before passing it to respective LTE MAC and PHY entities corresponding to the subscriber. Every subscriber attached to the network via the WoLTEN agent has a unique instance of a corresponding WoLTEN protocol stack.

Methods—

The exemplary Wi-Fi PIPE between the WoLTEN APP 1306 and WoLTEN Agent 1308 is self contained. The Wi-Fi link is managed without input from external entities. The WoLTEN APP and WoLTEN Agent communicate bi-directionally over the WoLTEN Control Channel and are responsible for:

a) Wi-Fi PIPE management when in the coverage area of AP 300, which further may include:
    a. configuration of the Wi-Fi PIPE, monitoring and maintaining the operation of the Wi-Fi PIPE according to radio link performance; and
    b. acquisition and configuration of an LTE session with the Evolved Packet Core (EPC) network that is configured to provide sufficient throughput for the Wi-Fi PIPE;

b) LTE link management (to assist in selection between LTE and Wi-Fi interfaces) which generally includes:
    a. system information transfer;
    b. paging channel operation;
    c. cell measurement and responsive cell reselection and hand-off procedures;
    d. radio resource control (RRC);

e. security, integrity, access control (e.g., via SIM);
f. call control;
c) mobility control; and
d) WoLTEN session initiation;
  a. discovery, initiation and configuration of the WoL-TEN session (e.g., for hotspots which support both WoLTEN and legacy operation).

Yet other physical and/or logical entities may be useful for operation, the inclusion or exclusion of such entities being within the skill of artisans in the related arts given the contents of the present disclosure.

In more detail, the Wi-Fi PIPE management controls the wireless connectivity between the subscriber device and wireless router. In one embodiment, Wi-Fi hotspot functionality is based on legacy components operating according to e.g., existing IEEE 802.11n specifications; in other embodiments, the Wi-Fi hotspot functionality may be integrated with the WoLTEN APP and/or WoLTEN Agent to optimize performance for use specific to the Wi-Fi PIPE. For example, the WoLTEN Agent can monitor the performance of the LTE network connectivity and use the monitored performance to inform Wi-Fi PIPE operation to e.g., improve resource allocation of users, etc. By coordinating channel and bandwidth assignments, the WoLTEN Agent can reduce the amount of buffering and/or provide better quality (e.g. low latency and low jitter) links configured for services such as VoLTE (Voice over LTE) or VoIP (Voice over IP). It is appreciated that certain operations may not directly affect the radio link (e.g., Wi-Fi registration, Intra-Wi-Fi hand-off, Wi-Fi Power management and Wi-Fi QoS, etc.); depending on implementation, these features can be handled within either legacy components and/or the WoLTEN APP/Agent.

In one embodiment, LTE network connectivity is based on legacy components operating according to e.g., existing LTE specifications; in other embodiments, the LTE link functionality may be integrated with the WoLTEN APP and/or WoLTEN Agent to optimize performance for use specific to the Wi-Fi PIPE. As previously alluded to, the performance of the LTE link can be monitored to improve Wi-Fi PIPE operation. Similarly, operations which may not directly affect the LTE performance may be handled by legacy components, or incorporated within the WoLTEN Agent and/or WoLTEN APP. Common examples include, without limitation: LTE network acquisition (selection and reselection), Authentication, Encryption, Integrity Protection, Call Control (call/session set-up/tear-down), Mobility (Intra and Inter LTE hand-off), etc.

Figure 14:
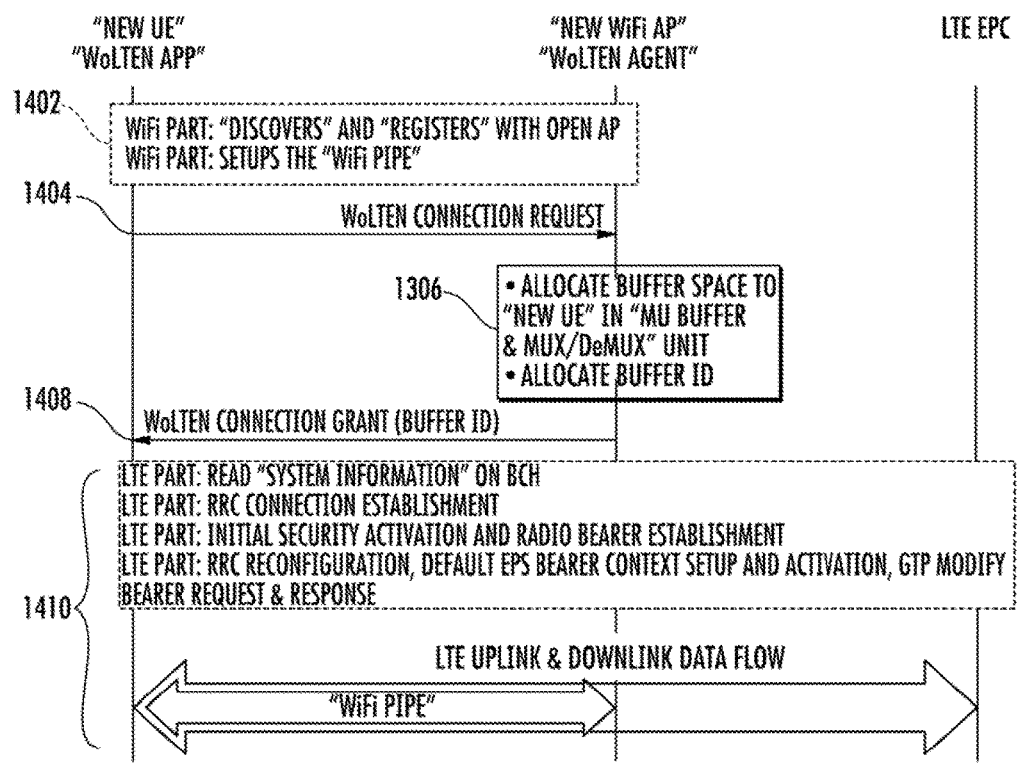
FIG. 14 is a logical flow diagram of one generalized process for discovery, initiation and configuration of a mobility management session.

With regards to mobility management, one embodiment of a generalized process for discovery, initiation and configuration of a session is depicted within FIG. 14. As shown, the WoLTEN APP and/or WoLTEN Agent are configured to discover, initiate and configure the WoLTEN session and Wi-Fi PIPE.

At step 1402 of the process 1400, a subscriber device discovers an enabled wireless network. The subscriber device determines whether the wireless network supports WoLTEN operation. Common examples of discovery include without limitation: decoding control broadcasts, direct inquiry, etc.

In some variants, the wireless network is an "open" network. Open networks do not have restrictive access controls (e.g., authentication, authorization, etc.). In other networks, the network may be closed, partially limited, etc. For example, the subscriber device may be required to prompt the user for a password or to press a button on the wireless router, etc. In still other cases, the subscriber device may be allowed access via out-of-band procedures (e.g., allowed by an administrator, etc.). Various other suitable schemes are appreciated by those of ordinary skill within the related arts, given the contents of the present disclosure.

At step 1404, when the subscriber device determines that the wireless network supports WoLTEN operation, the WoLTEN APP attempts to establish an access tunnel (or Wi-Fi PIPE session) between the subscriber device and a network operator via the wireless router. In one embodiment, the access tunnel includes a Wi-Fi PIPE between the subscriber device and the wireless router. In one such example, a WoLTEN APP (or WoLTEN Agent) transmits a WoLTEN Connection Request via a WoLTEN Control Channel; the Connection Request includes information pertinent to connection establishment. Common examples of information include e.g., software version, a list of Wi-Fi and LTE neighbors, etc.

At step 1406 of the process 1400, responsive to reception of the Connection Request, the WoLTEN Agent determines whether a WoLTEN connection can be established. In some cases the WoLTEN Agent may be unable to support the connection request due to resource limitations (e.g., lack of memory, insufficient processing power, unable to access network operators, etc.). If the WoLTEN Agent can support the connection request, then the WoLTEN Agent allocates or reserves memory for the data stream buffering corresponding to the subscriber device. In one embodiment, a portion or partition of the MU Buffer & MUX/DeMUX buffer of the WoLTEN Agent is reserved and issued a Buffer ID (Handler). The Buffer ID is provided to the WoLTEN APP, and thereafter the subscriber device WoLTEN APP will use the Buffer ID to access/modify its corresponding WoLTEN connection (the WoLTEN Agent may be handling multiple distinct subscribers simultaneously).

At step 1408, if the WoLTEN connection request was successful, then the WoLTEN Agent provides the connection parameters back to the WoLTEN APP via a WoLTEN Connection Grant. In one implementation, the connection parameters include the Buffer ID. Other common examples of connection parameters may include e.g., quality of the connection, maximum data rate and/or throughput, minimum data rate and/or throughput, latency, other connection limitations (e.g., QoS), etc.

At step 1410, thereafter the subscriber device can transact data via the WoLTEN connection. More generally, the subscriber device can perform "access tunneled" LTE operation e.g., system acquisition, connection establishment, activation, radio bearer establishment, and data flow, etc.

Figure 15:
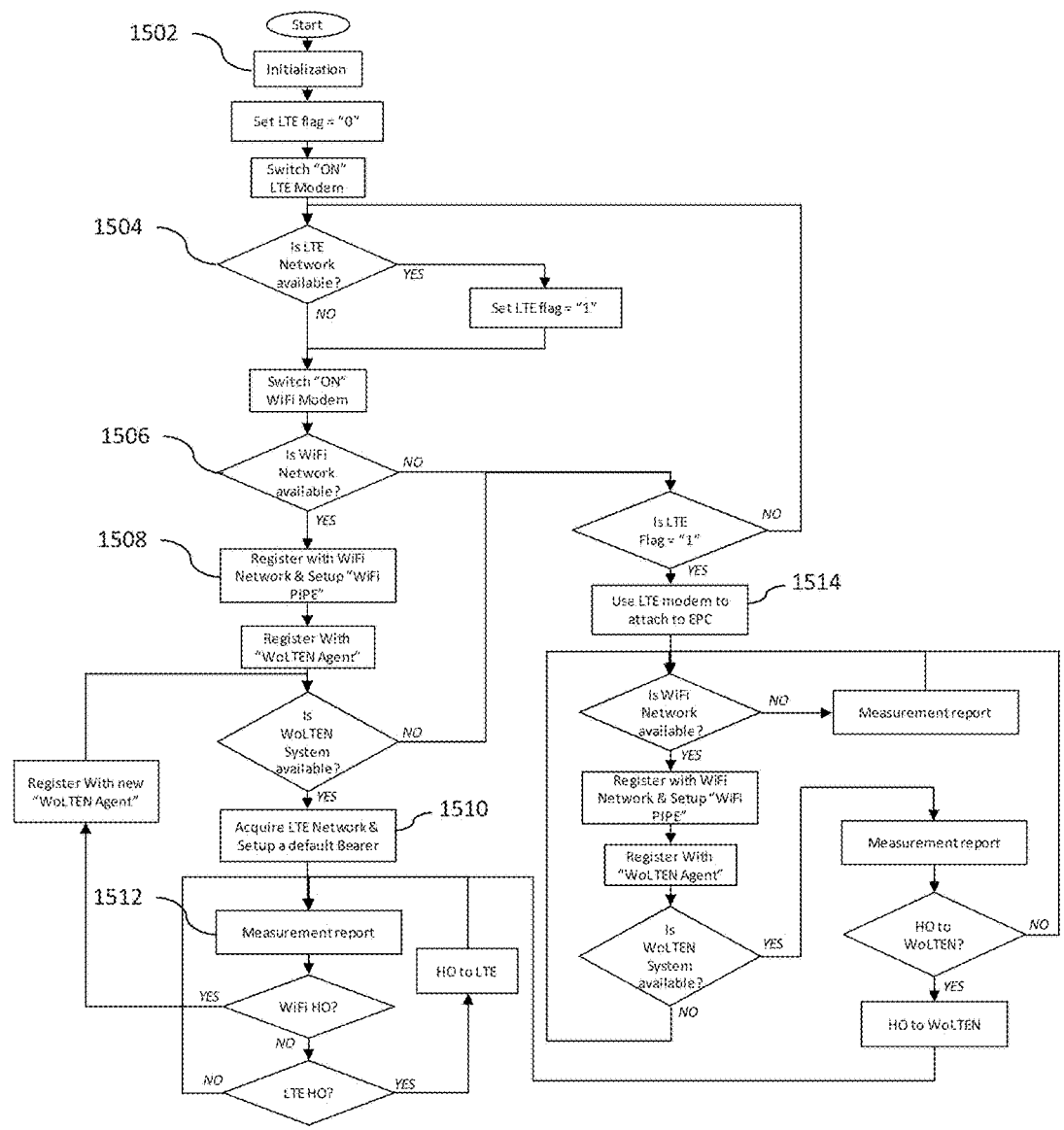
FIG. 15 is a logical flow diagram illustrating the initialization of a Wi-Fi over Long Term Evolution (WoLTEN) connection of one exemplary WoLTEN application (APP) executed on a subscriber device.

FIG. 15 illustrates an exemplary logical flow for initiating a WoLTEN connection of one exemplary embodiment of a WoLTEN APP executed on a subscriber device platform.

At step 1502, when the subscriber device is first Powered ON or Reset, the WoLTEN APP initializes and sets its internal variables and flags to default values (e.g. "LTE Flag" is reset to "0" to indicate that no LTE network is currently available).

At step 1504, after initialization, the WoLTEN APP enables the LTE Modem and searches for available LTE eNBs and networks. Upon detecting a desired network and eNB, the WoLTEN APP sets the "LTE Flag" to "1" to indicate that LTE network access is available.

Before attaching to the LTE network, the WoLTEN APP attempts to search for a Wi-Fi network to attempt WoLTEN operation. Generally, WoLTEN is preferable to LTE access as WoLTEN operation consumes less power and/or supports higher data rates, etc. It is appreciated that certain other implementations may incorporate different priority schemes.

At step 1506, the WoLTEN APP enables a Wi-Fi modem and looks for nearby Wi-Fi APs. In some cases, the WoLTEN APP may have a preferred access mode that is configured specifically to find wireless routers.

At step 1508, if a Wi-Fi Access Point (AP) is found, the WoLTEN APP will register with it. In simple implementations, the Wi-Fi AP is operating in an "open" mode. If the WoLTEN APP cannot register with the Wi-Fi AP then the WoLTEN APP proceeds as if no Wi-Fi AP was found. Closed Wi-Fi APs may still be accessible via an alternative access scheme (described subsequently).

At step 1510, if the WoLTEN APP has successfully registered with the Wi-Fi AP, then the WoLTEN APP will interrogate the AP to find out whether or not it has a suitable WoLTEN Agent. In one embodiment, the interrogation includes a WoLTEN Connection Request/WoLTEN Connection Grant transaction. If the WoLTEN interrogation is successful then the "WoLTEN APP" can continue with LTE network acquisition/registration via the Wi-Fi PIPE, using the wireless router's network connection (e.g., Ethernet).

Periodically during the WoLTEN connection, the WoLTEN APP will measure performance to determine whether a better Wi-Fi AP or LTE eNB is available. In one embodiment, the subscriber device may periodically power its own LTE cellular interface to perform appropriate measurements. These measurements are reported to the LTE network; the LTE network may responsively cause a hand-off (HO). Exemplary measurements which are useful for HO may include, without limitation: Received Signal Strength Indicator (RSSI) signal level measurements, Signal to Noise Ratio (SNR), Bit Error Rate (BER), etc. Other useful information may include e.g., the neighbor list for LTE eNBs which is based on measurements made by the subscriber device's LTE PHY.

Referring back to step 1514, when no Wi-Fi network is available but one or more LTE networks are, the WoLTEN APP will proceed to use LTE network, while continuously looking for a WoLTEN enabled Wi-Fi AP.

Figure 16:
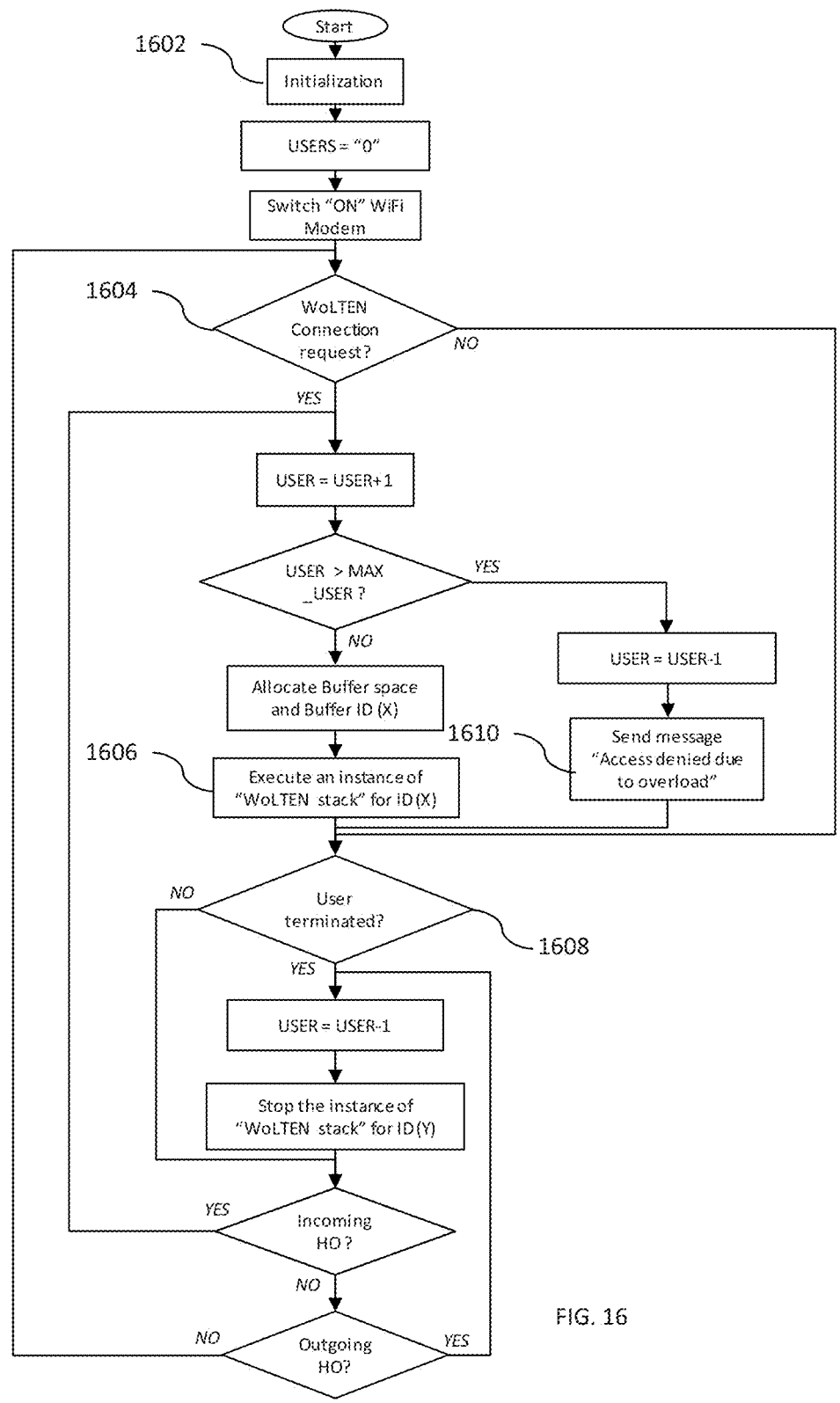
FIG. 16 is a logical flow diagram illustrating the initialization of a Wi-Fi over Long Term Evolution (WoLTEN) connection of one exemplary WoLTEN agent executed on a wireless router.

FIG. 16 illustrates a logical flow for initiating a WoLTEN connection of one exemplary embodiment of a WoLTEN Agent executed on a wireless router.

At step 1602, when the wireless router is first Powered ON or Reset, the WoLTEN APP initializes and sets its internal variables and flags to default values (e.g. "USER" set to "0" to indicate that no users are currently being served, and MAX_USER set to "1" for single user operation), and proceeds to switch ON the Wi-Fi Modem.

At step 1604, responsive to receiving a WoLTEN Connection Request message, the WoLTEN Agent determines whether or not the Connection Request can be serviced. In one exemplary embodiment, the WoLTEN Agent increments the USER register and verifies that the number of users has not exceeded the maximum allowed number of users. If the maximum allowed number of users is not reached, then the WoLTEN Agent proceeds to allocate buffer space on a MU Buffer & MUX/DeMUX buffer and allocate a Buffer ID to the WoLTEN APP, which is communicated to the WoLTEN APP with a WoLTEN Connection Grant. During subsequent transactions, the WoLTEN APP is expected to use the Buffer ID every time it sends a message; in some implementations, the Buffer ID may be extracted by association with a Wi-Fi user ID (e.g. MAC address) of the incoming packets).

Otherwise, if the Connection Request cannot be serviced (e.g., the maximum number of users is reached), then the new user is denied access. In some cases, an informational message is sent to inform them of the failure (e.g., system overload).

At step 1606, the WoLTEN Agent launches an instance of the WoLTEN protocol stack for the new user (Each WoLTEN APP requires an instance of a WoLTEN protocol stack).

Periodically, the WoLTEN Agent checks to see whether or not a user has terminated a connection (step 1608). When a user has terminated a connection, the WoLTEN Agent decrements the USER register and stops the corresponding WoLTEN protocol stack instance associated with the corresponding WoLTEN APP.

Incoming hand-offs (HO) have a similar flow to adding a new user (see step 1604), whereas outgoing hand-offs are similar to user termination (see step 1608).

Myriad other schemes for implementing hybrid access to a core network will be recognized by those of ordinary skill given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A method for wireless communications comprising a first and a second communications systems, where the first communications system has at least a first node and a second node in communications with each other, comprising:
    modifying a protocol stack of the first node, said modification comprising splitting the protocol stack into a first portion of layers and a second portion of layers, the first portion of layers and the second portion of layers configured to transact one or more data payloads;
    executing the first portion of layers within the first node, and causing the second node to execute the second portion of layers; and
    communicating the one or more data payloads via the second communications system;
    where the combined execution of the first portion of layers and the second portion of the layers enables communications with at least one logical entity in the first communications system.

2. The method of claim 1, where the first node comprises a handset and the second node comprises a logical cellular base station system and the second communications system is a Wireless Local Area Network (WLAN).

3. The method of claim 2, where the handset comprises a Long Term Evolution (LTE) user equipment (UE), the WLAN AP comprises a logical LTE enhanced NodeB (eNB), the cellular network comprises an LTE Fourth Generation (4G) system, and the second communications system comprises a WLAN network.

4. The method of claim 3, further comprising providing an access tunnel between the first node RLC layer and the second node RLC layer of the first communication system via the second communication system.

5. The method of claim 2, where the act of splitting the protocol stack further comprises splitting the protocol stack between a radio link control (RLC) layer and a medium access control (MAC) layer of a Long Term Evolution (LTE) protocol stack.

6. The method of claim 1, further comprising providing an access tunnel between the first portion of layers and the second portion of layers in an unsecure open mode via the second communications system.

7. The method of claim 1, further comprising providing an access tunnel between the first portion of layers and the second portion of layers in a secure closed mode via the second communications system.

8. The method of claim 1, further comprising executing a Wi-Fi over Long Term Evolution (WoLTEN) software application at the first node.

9. The method of claim 8, further comprising causing the second node to execute a Network WoLTEN agent application.

10. The method of claim 9, further comprising establishing a WoLTEN dedicated control channel between the WoLTEN software application and the WoLTEN agent.

11. The method of claim 10, where the WoLTEN software application comprises a multiplexing and de-multiplexing (MUX/DeMUX) buffer.

12. The method of claim 10, where the WoLTEN agent application comprises a multiplexing and de-multiplexing (MUX/DeMUX) buffer.

13. The method of claim 1, where the second node is further configured to communicate with one or more handsets.

14. A method for wireless communications via first and second communication systems, the first communication system having at least a first node and a second node in data communication with each other, and a first and second protocol stack corresponding to the first and second nodes, wherein during normal operation each of the first and second protocol stacks comprises a first portion and a second portion, the first portion and the second portion of the first protocol stack of the first node configured to transact one or more data payloads with the first portion and the second portion of the second protocol stack of the second node, the method comprising:

executing the first portion of the first protocol stack at the first node, and causing execution of a replacement second portion of the first protocol stack at the second node; and communicating one or more data payloads via the second communication system;

wherein the execution of the first portion of the first protocol stack at the first node and the replacement second portion of the first protocol stack at the second node cooperates to enable communication with one or more logical entities in the first communication system.

15. The method of claim 14, wherein the act of communicating one or more data payloads further comprises creating an access tunnel between the first portion of the first protocol stack and the replacement second portion of the first protocol stack in a secure closed mode.

16. The method of claim 14, further comprising controlling a radio link between the first node and the second node via the second communication system with a dedicated control tunnel.

17. The method of claim 16, wherein the act of controlling the radio link comprises coordinating channel and bandwidth assignments for the radio link.

18. A method for wireless communications comprising a first and a second communications system, where the first communications system has at least a first node and a second node in communications with each other, comprising:

modifying a protocol stack of the first node, said modification comprising splitting the protocol stack into a first portion of layers and a second portion of layers, the first portion of layers and the second portion of layers transacting one or more data payloads;

executing the first portion of layers within the first node, and causing the second node to execute a fake second portion of layers that optimizes one or more operations between the second portion of layers and at least one layer of the second node;

communicating the one or more data payloads via the second communications system such that the combined execution of the first portion of layers and the faked second portion of the layers enables communications with at least one logical entity in the first communications system.

19. The method of claim 18, wherein the act of splitting the protocol stack comprises splitting the protocol stack between an RLC layer and a MAC layer of an LTE protocol stack.

20. The method of claim 18, wherein the optimization of the one or more operations comprises bypassing the at least one layer in the second node.

* * * * *